United States Patent
Tanzawa et al.

(10) Patent No.: US 12,444,971 B2
(45) Date of Patent: Oct. 14, 2025

(54) POWER SUPPLY DEVICE CAPABLE OF MAINTAINING, OVER A LONG PERIOD, THE FUNCTION OF INCREASING THE VOLTAGE OF A POWER GENERATION ELEMENT USING A SECONDARY BATTERY

(71) Applicants: NATIONAL UNIVERSITY CORPORATION SHIZUOKA UNIVERSITY, Shizuoka (JP); ZEON CORPORATION, Tokyo (JP)

(72) Inventors: Toru Tanzawa, Hamamatsu (JP); Hideki Uchida, Tokyo (JP)

(73) Assignees: NATIONAL UNIVERSITY CORPORATION SHIZUOKA UNIVERSITY (JP); ZEON CORPORATION (JP)

(*) Notice: Subject to any disclaimer, the term of this patent is extended or adjusted under 35 U.S.C. 154(b) by 846 days.

(21) Appl. No.: 17/768,322

(22) PCT Filed: Oct. 13, 2020

(86) PCT No.: PCT/JP2020/038596
§ 371 (c)(1),
(2) Date: Apr. 12, 2022

(87) PCT Pub. No.: WO2021/075419
PCT Pub. Date: Apr. 22, 2021

(65) Prior Publication Data
US 2024/0113549 A1    Apr. 4, 2024

(30) Foreign Application Priority Data
Oct. 17, 2019    (JP) .................... 2019-190049

(51) Int. Cl.
*H01M 10/46*      (2006.01)
*H02J 7/00*       (2006.01)
(Continued)

(52) U.S. Cl.
CPC ............ *H02J 7/342* (2020.01); *H02J 7/0063* (2013.01); *H02J 7/345* (2013.01); *H02J 50/001* (2020.01);
(Continued)

(58) Field of Classification Search
CPC .. H02J 7/0063; H02J 7/342; H02J 7/34; H02J 2207/20; H02M 3/07; H02M 3/155
(Continued)

(56) References Cited

U.S. PATENT DOCUMENTS

2022/0311265 A1*  9/2022  Huang .................... H02J 7/34

FOREIGN PATENT DOCUMENTS

| JP | 2003-284249 A | 10/2003 |
|----|---------------|---------|
| JP | 2011-172377 A | 9/2011  |

(Continued)

OTHER PUBLICATIONS

International Search Report mailed Dec. 15, 2020 in corresponding PCT International Application No. PCT/JP2020/038596.
(Continued)

*Primary Examiner* — Edward Tso
(74) *Attorney, Agent, or Firm* — OSTROLENK FABER LLP

(57) ABSTRACT

A power supply device includes a power generation element that converts external energy into electrical energy and outputs the electrical energy as a voltage ($V_{EH}$), a secondary battery that is connected in series with the power generation element and outputs a voltage ($V_{BAT}$), and a power conversion unit that receives the voltage ($V_{EH}$) and the voltage ($V_{BAT}$) and outputs power ($P_{OUT}$) to a load circuit. The power conversion unit includes a voltage conversion unit connected in series with the power generation element and the secondary battery, a power storage unit connected to the voltage conversion unit, an output terminal for connecting
(Continued)

the power storage unit to the load circuit, and an output terminal for connecting the power storage unit to the secondary battery.

6 Claims, 18 Drawing Sheets

(51) Int. Cl.
     *H02J 7/34*      (2006.01)
     *H02J 50/00*     (2016.01)
(52) U.S. Cl.
     CPC ....... *H02J 2207/20* (2020.01); *H02J 2207/50* (2020.01)
(58) Field of Classification Search
     USPC .............................. 320/107, 137, 157, 162
     See application file for complete search history.

(56) References Cited

FOREIGN PATENT DOCUMENTS

| | | | |
|---|---|---|---|
| JP | 2013-027140 A | 2/2013 |
| JP | 5347052 B2 | 11/2013 |
| JP | 2015-195651 A | 11/2015 |
| JP | 5888008 B2 | 3/2016 |

OTHER PUBLICATIONS

English translation of the International Preliminary Report on Patentability (IPRP) (Chapter 1) mailed Apr. 28, 2022 with Notification from the International Bureau (Form PCT/IB/338) in corresponding PCT International Application No. PCT/JP2020/038596.

Antonio Carlos M. de Queiroz, "Electrostatic Vibrational Energy Harvesting Using a Variation of Bennet's Doubler", IEEE, 2010, pp. 404-407.

Toru Tanzawa, "Innovation of Switched Capacitor Voltage Multiplier", IEEE Solid State Circuits Magazine, Sep. 2, 2016, pp. 63-73.

\* cited by examiner (a)

(b)

(a)

(b)

POWER SUPPLY DEVICE CAPABLE OF MAINTAINING, OVER A LONG PERIOD, THE FUNCTION OF INCREASING THE VOLTAGE OF A POWER GENERATION ELEMENT USING A SECONDARY BATTERY

CROSS-REFERENCE TO RELATED APPLICATIONS

The present application is a 35 U.S.C. § 371 national stage application of International Application No. PCT/JP2020/038596, filed Oct. 13, 2020, which claims priority to Japanese Patent Application No. 2019-190049, filed Oct. 17, 2019, the contents of both of which are incorporated herein by reference. The PCT International Application was published in the Japanese language.

TECHNICAL FIELD

The present invention relates to a power supply device.

BACKGROUND ART

A technology that utilizes previously unused environmental energy such as vibration or heat is attracting attention. Such a technology is called energy harvesting. The energy harvesting is attracting attention as a power supply technology that is applied to sensors for the so-called Internet of Things (IoT). For example, sensors to which an energy harvesting technology has been applied are driven using energy recovered from vibrations or heat present in an environment in which a device is installed. Patent Literatures 1 to 3 and Non-Patent Literatures 1 and 2 are known as technologies regarding energy harvesting.

CITATION LIST

Patent Literature

[Patent Literature 1] Japanese Unexamined Patent Publication No. 2011-172377
[Patent Literature 2] Patent No. 534052
[Patent Literature 3] Patent No. 588008

Non-Patent Literature

[Non-Patent Literature 1] Antonio Carlos M. de Queiroz, "Electrostatic Vibrational Energy Harvesting Using a Variation Bennet's Doubler," IEEE, 2010. pp. 404-407.
[Non-Patent Literature 2] Toru Tanzawa, "Innovation of Switched Capacitor Voltage Multiplier," IEEE SOLID STATE CIRCUITES MAGAZINE, IEEE, Sep. 2, 2016, pp. 63-73.

SUMMARY OF INVENTION

Technical Problem

Generally, power obtained by using an energy harvesting technology is weak. Therefore, the power is insufficient to operate a device such as a sensor or a communication IC. Therefore, for example, a boosting circuit is used to boost a voltage to a voltage required by the device. However, the boosting circuit is a switching circuit configured of a semiconductor element. Therefore, when a voltage applied to the boosting circuit is too low, conversion efficiency of the boosting circuit may be greatly degraded. For example, the technology disclosed in Non-Patent Literature 1 has a problem that conversion efficiency is low when power with a low voltage generated by a power generation element is converted to power with a voltage required by an IC. As a result, it may not be possible to efficiently output a required voltage.

Further, it is also desired for the energy harvesting technology to continue to operate for a long period of time without a need for continuous supply of external power or regular replacement of a battery by recovering energy from a surrounding environment. The technology disclosed in Non-Patent Literature 2 increases energy by boosting power generated by a vibration power generation element using a voltage of a battery. When power of the battery is used by another IC, it is desirable for an output voltage of the battery to be constant. Therefore, the technology disclosed in Non-Patent Literature 2 does not contribute to extension of the life of the battery.

Therefore, the present invention provides a power supply device capable of outputting desired power for a long period of time.

Solution to Problem

A power supply device according to an aspect of the present invention includes a power generation element configured to convert external energy into electrical energy and output the electrical energy as a first voltage; a secondary battery configured to be connected in series with the power generation element and output a second voltage; and a power conversion unit configured to receive the first voltage and the second voltage and output power to a load circuit, wherein the power conversion unit includes a voltage conversion unit connected in series with the power generation element and the secondary battery; a power storage unit connected to the voltage conversion unit; a first output terminal configured to connect the power storage unit to the load circuit; and a second output terminal configured to connect the power storage unit to the secondary battery.

In the power supply device, the power conversion unit receives the first voltage that is output by the power generation element and the second voltage that is output by the secondary battery. The power conversion unit includes the voltage conversion unit. Therefore, it is possible to step down the third voltage, which is the sum of the first voltage and the second voltage. As a result, it is possible to increase a current received by the power conversion unit depending on a drop of the voltage. The power conversion unit can output output power to the load circuit and output charging power to the secondary battery by dropping the voltage and increasing the current. The power stored in the storage unit is based on the voltage that is the sum of the first voltage and the second voltage. As a result, it is possible to output the output power distributed from the power stored by the storage unit, as a voltage higher than the first voltage. Therefore, the power supply device can output desired power to the load circuit. Further, the charging power is output to the secondary battery. Therefore, power required to increase the voltage of the power generation element is substantially reduced. That is, it is possible to maintain a function of assisting the voltage of the secondary battery for a long period of time.

The voltage conversion unit of the power supply device according to an aspect may receive the first voltage from the power generation element and the second voltage from the secondary battery, and convert a third voltage, the third voltage being a sum of the first voltage and the second voltage, to a fourth voltage equal to or higher than the second voltage and equal to or lower than the third voltage. According to this configuration, it is possible to output the fourth voltage, which is equal to or higher than the second voltage and equal to or lower than the third voltage, to the load circuit.

The power storage unit of the power supply device according to the aspect may store power based on the fourth voltage. According to this configuration, it is possible to output the fourth voltage from the power storage unit to the load circuit.

The power conversion unit of the power supply device according to the aspect is able to switch between a charging state in which power is supplied from the power storage unit to the secondary battery and a non-charging state in which the supply of the power from the power storage unit to the secondary battery stops. According to this configuration, it is possible to perform an operation of charging the secondary battery by sending power to the secondary battery and an operation of storing power in the power storage unit without sending the power to the secondary battery at a timing when the load circuit does not require power.

One terminal of the secondary battery according to the aspect may be connected to a ground potential. The other terminal of the secondary battery may be connected to the power generation element and the power conversion unit. One terminal of the power generation element may be connected to the secondary battery. The other terminal of the power generation element may be connected to the power conversion unit. According to this configuration, it is possible to suitably charge the secondary battery.

The power supply device according to the aspect may further include an impedance adjustment unit configured to deliver power from the power generation element to the power conversion unit. The impedance adjustment unit may include a first circuit unit including an input terminal connected to the power generation element and an output terminal connected to the power conversion unit, and a second circuit unit including a connection point connected to the first circuit unit, a connection point connected to a ground potential, and a capacitor connected between the connection point and the connection point. A resistance of an output resistor included in the second circuit unit may be smaller than that of an output resistor included in the power generation element. According to this configuration, the capacitor of the second circuit unit included in an impedance adjustment circuit is charged with the power received from the power generation element via the input terminal of the first circuit unit. The capacitor transfers the power to the power conversion unit via the output terminal of the first circuit unit. As a result, when the power is transferred to the power conversion unit, the capacitor is seen as a power source instead of the power generation element. The output resistor between the capacitor and the output terminal has a smaller resistance than the output resistor of the power generation element. As a result, it is possible to curb drop of voltage occurring in the power transferred to the power conversion unit, as compared with a configuration in which the power generation element is directly connected to the power conversion unit. Therefore, it is possible to perform efficient transfer of the power.

Advantageous Effects of Invention

According to the present invention, a power supply device capable of outputting desired power for a long period of time is provided.

BRIEF DESCRIPTION OF DRAWINGS

FIG. 9(*b*) is a diagram illustrating a charging operation of a secondary battery.

FIG. 14(*b*) is a diagram illustrating a part of a configuration of a power supply device of modification example 4.

DESCRIPTION OF EMBODIMENTS

Hereinafter, embodiments for carrying out the present invention will be described in detail with reference to the accompanying drawings. In description of the drawings, the same elements are denoted by the same reference signs and repeated description will be omitted.

First Embodiment

Figure 1:
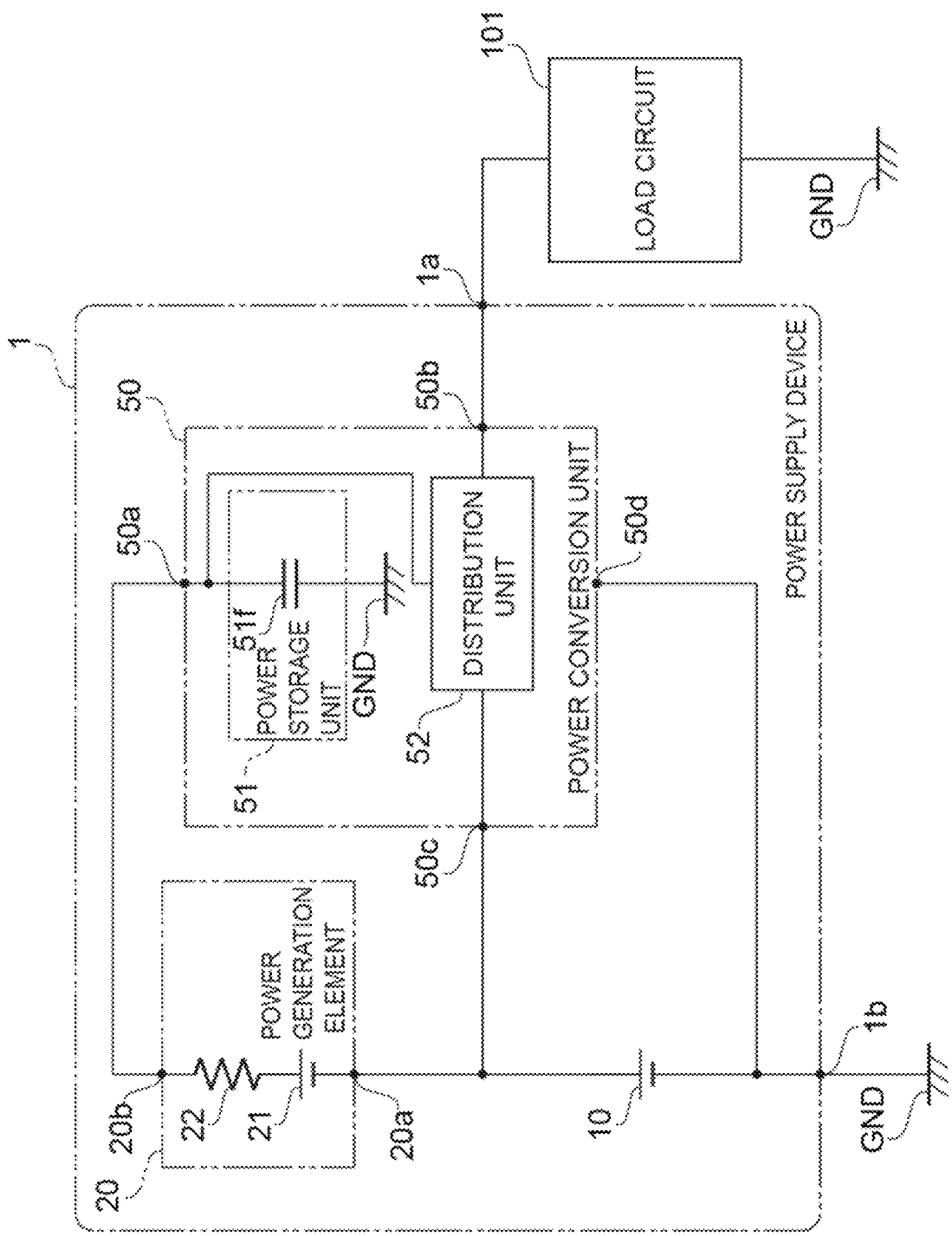
FIG. 1 is a diagram illustrating a configuration of a power supply device according to a first embodiment.

As illustrated in FIG. 1, a power supply device 1 supplies power to the load circuit 101. The load circuit 101 may be a device constituting the IoT. Examples of such a device may include a sensor that measures a surrounding environment. The sensor obtains a measurement value regarding a desired measurement parameter such as temperature, humidity or illuminance. The load circuit 101 requires power of about several watts. For example, a voltage required by the load circuit 101 is about 3 V. The power supply device 1 supplies predetermined power to the load circuit 101 at a timing required by the load circuit 101. The load circuit 101 may not continuously request the power supply device 1 to supply the power. For example, the load circuit 101 performs an operation of measuring an ambient temperature and an operation of performing transmission through a wireless IC or the like at predetermined time intervals. The load circuit 101 receives the power from the power supply device 1 at a timing when temperature measurement and communication are performed.

The power supply device 1 includes an output terminal 1a and a ground terminal 1b. The output terminal 1a is connected to the load circuit 101. The output terminal 1a outputs power ($P_{OUT}$) to the load circuit 101. The ground terminal 1b is connected to a ground potential GND. The ground terminal 1b receives a reference potential from the ground potential GND.

The power supply device 1 includes a secondary battery 10, a power generation element 20, and a power conversion unit 50. The power supply device 1 may include additional components, in addition to the above components, as necessary.

The secondary battery 10 performs a charging operation and a discharging operation. The secondary battery 10 outputs a DC voltage such as 3 V or 5 V. The voltage output by the secondary battery 10 may correspond to the voltage required by the load circuit 101. For example, when the load circuit 101 requires a DC voltage of 3 V, the voltage output by the secondary battery 10 may be at least 3 V or more. In the following description, the voltage output by the secondary battery 10 is shown as $V_{BAT}$ (a second voltage). A negative electrode of the secondary battery 10 is connected to the ground terminal 1b. A positive electrode of the secondary battery 10 is connected to the power generation element 20.

The power generation element 20 receives external energy. The power generation element 20 converts the received external energy into electrical energy. As the power generation element 20, various elements capable of converting external energy into electrical energy may be used.

Examples of a power generation element for a DC voltage may include a solar cell using solar energy, and a thermoelectric conversion element using bias of charge due to a temperature difference. Examples of a power generation element for an AC voltage may include a piezoelectric element using disturbance of a dipole moment due to vibration, a vibration element using an electromagnetic induction voltage, a pyroelectric element using a pyroelectric effect, and an RF element that generates electricity by receiving radio waves.

In particular, the thermoelectric conversion element is expected to have an extended application range in the future because it uses thermal energy, which is the most common form of energy. Examples of a material to be used for the thermoelectric conversion element include an inorganic semiconductor and an organic conductive polymer. An element using carbon nanotubes (CNTs) has flexibility and is lightweight. Further, the element using the carbon nanotubes (CNTs) is an element using a thin film. Therefore, it is possible to realize a structure capable of expanding a temperature difference as compared with other materials even in the same environment by adopting the element using the carbon nanotubes (CNTs) as the power generation element 20. As a result, a usage environment in which the power generation element 20 can be attached is greatly expanded. Therefore, it is possible to extend a range of application.

As carbon nanotubes (CNTs), single-walled carbon nanotubes (single-walled CNTs) and multi-walled carbon nanotubes (multi-walled CNTs) can be used. It is preferable to use the single-walled CNTs as the carbon nanotubes (CNTs). As the CNTs, the single-walled CNTs or the multi-walled CNTs may be used alone. A combination of CNTs may be used. When the combination is used, a content ratio of the single-walled CNTs is preferably 50% by mass or more. Further, the content ratio of the single-walled CNTs is more preferably 70% by mass or more. Further, the content ratio of the single-walled CNTs is preferably 90% by mass or more. An average diameter of the single-walled CNTs is equal to or larger than 0.7 nm and equal to or smaller than 15 nm. In the single-walled CNTs, preferably, a ratio of G band peak intensity to D band peak intensity in a Raman spectrum (G/D ratio) is equal to or larger than 1 and equal to or smaller than 20. In the single-walled CNTs, preferably, an average length of fibrous carbon nanostructures at the time of synthesis is equal to or larger than 100 μm. A BET specific surface area of the single-walled CNTs is preferably equal to or larger than 600 m$^2$/g. The BET specific surface area is more preferably equal to or larger than 800 m$^2$/g. The BET specific surface area is preferably equal to or smaller than 2500 m$^2$/g. The BET specific surface area is more preferably equal to or smaller than 1200 m$^2$/g.

For fabrication of single-walled CNTs, for example, a super growth method (see International Publication No. 2006/011655) may be adopted. With the super growth method, catalytic activity of a catalytic layer is dramatically improved. For example, a raw material compound and a carrier gas are supplied on a base material having a catalyst layer for fabrication of carbon nanotubes on a front surface. That is, when CNTs are synthesized using a chemical vapor deposition method (CVD method), a trace amount of an oxidizing agent (catalyst activator) is caused to be present in a system. According to this method, efficient fabrication is possible because the catalyst layer is formed on the front surface of the base material through a wet process. Hereinafter, carbon nanotubes obtained by using the super growth method may be referred to as "SGCNTs." The super growth carbon nanotubes (SGCNTs) have a higher purity than other CNTs. Further, SGCNTs have a large power generation capacity (Seebeck coefficient) because of their high doping effect. Therefore, SGCNTs are highly suitable as a thermoelectric conversion element. The SGCNTs have characteristics of low cost and high material purity. Further, the SGCNTs also have a characteristic of easy doping.

The power generation element 20 is connected in series with the secondary battery 10. An output terminal 20b of the power generation element 20 is connected to the power conversion unit 50. The power generation element 20 includes a power generation body 21 and an output resistor 22. The power generation body 21 is connected to the secondary battery 10 via an input terminal 20a. The power generation body 21 is connected to the power conversion unit 50 via the output resistor 22 and the output terminal 20b.

An output voltage of the power generation element 20 is shown as a symbol ($V_{EH}$: first voltage). The output voltage ($V_{EH}$) of the power generation element 20 may be a DC voltage. The output voltage ($V_{EH}$) of the power generation element 20 may be an AC voltage. For example, when the power generation element 20 is an element that converts vibration energy into electrical energy, the power generation element 20 outputs an AC voltage having a frequency corresponding to a frequency of an input vibration. The power generation element 20 is connected in series with the secondary battery 10.

The power conversion unit 50 receives power from the power generation element 20. The power conversion unit 50 outputs some or all of the power received from the power generation element 20 to the load circuit 101. The power conversion unit 50 outputs power not output to the load circuit 101 to the secondary battery 10. The power conversion unit 50 redistributes the received power to the load circuit 101 and the secondary battery 10.

For example, the power conversion unit 50 includes a capacitor 51*f* as a power storage unit that stores power. The power conversion unit 50 includes a distribution unit 52 that distributes the power stored in the capacitor 51*f*. The power conversion unit 50 has four connection terminals. Specifically, the power conversion unit 50 has an input terminal 50*a*, an output terminal 50*b* (a first output terminal), an output terminal 50*c* (a second output terminal), and a ground terminal 50*d*. In some circuit configurations, the power conversion unit 50 may not have the ground terminal 50*d*.

The input terminal 50*a* is connected to the output terminal 20*b* of the power generation element 20. The input terminal 50*a* receives a voltage ($V_{IN}=V_{BAT}+V_{EH}$)<$V_{IN}$: third voltage>. The input terminal 50*a* is also connected to the capacitor 51*f*. The input terminal 50*a* outputs the received voltage ($V_{IN}$) to the capacitor 51*f*. The output terminal 50*b* is connected to the distribution unit 52. The output terminal 50*b* receives output power from the distribution unit 52. The output terminal 50*b* may be directly connected to the capacitor 51*f*. That is, the output terminal 50*b* may receive output power directly from the capacitor 51*f*. The output terminal 50*b* is further connected to the load circuit 101. The output terminal 50*b* outputs the received output voltage to the load circuit 101. The other output terminal 50*c* is connected to the distribution unit 52. The output terminal 50*c* receives charging power from the distribution unit 52. The output terminal 50*c* may also be directly connected to the capacitor 51*f* like the output terminal 50*b*. That is, the output terminal 50*c* may receive the charging power directly from the capacitor 51*f*. The output terminal 50*c* is connected to the secondary battery 10. The output terminal 50*c* outputs the received charging voltage to the secondary battery 10. The ground terminal 50*d* is connected to the ground terminal 1*b* of the power supply device 1.

The distribution unit 52 performs an operation of outputting the power stored in the capacitor 51*f* to the load circuit 101 in response to a request from the load circuit 101. The distribution unit 52 performs an operation of outputting the power stored in the capacitor 51*f* to the secondary battery 10 in a predetermined period. The distribution unit 52 performs an operation of not outputting power to either of the load circuit 101 and the secondary battery 10. According to this operation, the power is stored in the capacitor 51*f* with the passage of time.

Next, an operating principle of the power supply device 1 will be described with reference to FIG. 2.

Figure 2:
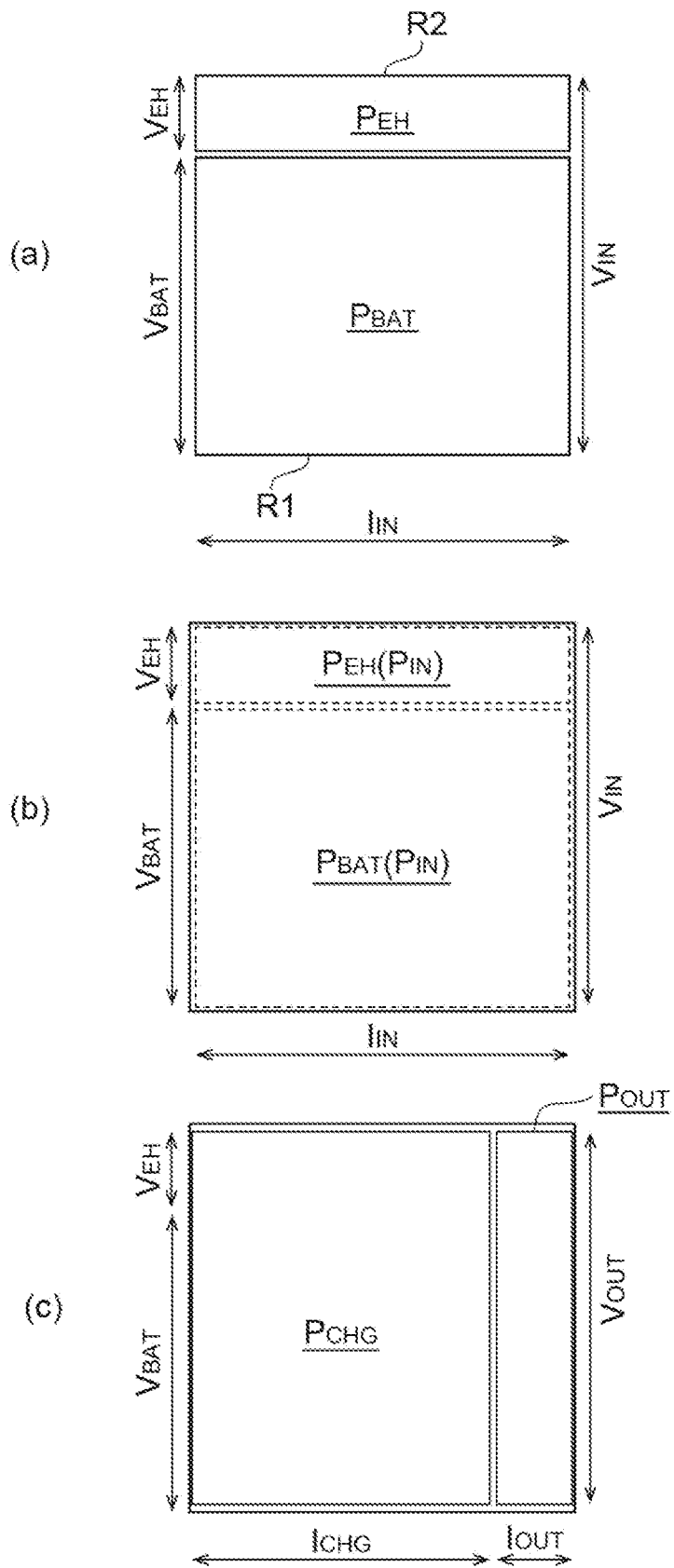
FIGS. 2(*a*), 2(*b*), and 2(*c*) are diagrams illustrating an operation of the power supply device illustrated in FIG. 1.

FIG. 2(*a*) illustrates the power that is input to the power conversion unit 50. Now, the secondary battery 10 outputs a voltage ($V_{BAT}$). The power generation element 20 outputs the voltage ($V_{EH}$). A current that is input to the power conversion unit 50 is a current (IN). The secondary battery 10, the power generation element 20, and the power conversion unit 50 are connected in series. Therefore, a current output by the secondary battery 10 is ($I_{IN}$). A current output by the power generation element 20 is also ($I_{IN}$).

Power ($P_{BAT}$) output by the secondary battery 10 is indicated by a rectangle R1. A horizontal axis of the rectangle R1 indicates the current ($I_{IN}$). A vertical axis of the rectangle R1 indicates the voltage ($V_{BAT}$). An area ($V_{BAT} \times I_{IN}$) of the rectangle R1 indicates the power ($P_{BAT}$) output by the secondary battery 10.

The power ($P_{EH}$) that is output by the power generation element 20 is indicated by a rectangle R2. A horizontal axis of the rectangle R2 indicates the current ($I_{IN}$). A vertical axis of the rectangle R2 indicates the voltage ($V_{EH}$). An area ($V_{EH} \times I_{IN}$) of the rectangle R2 indicates the power ($P_{EH}$) that is output by the power generation element 20.

FIG. 2(*b*) illustrates a total power ($P_{IN}$) stored in the capacitor 51*f* of the power conversion unit 50. The total power ($P_{IN}$) is a sum of the power ($P_{BAT}$) and the power ($P_{EH}$). The secondary battery 10 is connected in series with the power generation element 20. Therefore, a total voltage ($V_{IN}$), which is a sum of the voltage ($V_{BAT}$) and the voltage ($V_{EH}$), is input to the capacitor 51*f* of the power conversion unit 50. The current is the current ($I_{IN}$). Therefore, the total power ($P_{IN}$) can also be expressed as $P_{IN}=(V_{BAT}+V_{EH}) \times I_{IN}$.

FIG. 2(*c*) illustrates power that is output according to an operation of the distribution unit 52 of the power conversion unit 50. The distribution unit 52 distributes the total power ($P_{IN}$) stored in the capacitor 5*l* f as an output power ($P_{OUT}$) and a charging power ($P_{CHG}$).

The output power ($P_{OUT}$) is a product of an output voltage ($V_{OUT}$) and an output current ($I_{OUT}$). The output power ($V_{OUT}$) is equal to the total voltage ($V_{IN}=V_{BAT}+V_{EH}$). The output voltage ($V_{OUT}$) is higher than the voltage ($V_{EH}$) that is output by the power generation element 20. The power conversion unit 50 adds the power ($P_{BAT}$) output by the secondary battery 10 to the power ($P_{EH}$) output by the power generation element 20. As a result, the power conversion unit 50 can output the output voltage ($V_{OUT}$) higher than the voltage ($V_{EH}$) output by the power generation element 20. When the output current ($I_{OUT}$) is lower than the current ($I_{IN}$), the power conversion unit 50 can also make the power ($P_{EH}$) that is output by the power generation element 20 and the output power ($P_{OUT}$) equal to each other.

A remaining power obtained by subtracting the output power ($P_{OUT}$) from the total power ($P_{IN}$) can be returned to the secondary battery 10 as the charging power ($P_{CHG}$) for charging.

As a result, the output power ($P_{OUT}$) output by the power supply device 1 is apparently equal to the power ($P_{EH}$) output by the power generation element 20 and has a voltage ($V_{OUT}$) higher than the voltage ($V_{EH}$) that is output by the power generation element 20. This operation is realized by the assistance of the secondary battery 10 and a function of the distribution unit 52 of the power conversion unit 50. The power ($P_{BAT}$) of the secondary battery 10 output for assistance can be recovered depending on a magnitude of the output power ($P_{OUT}$). A condition for realizing a recovery operation is that the output power ($P_{OUT}$) is equal to or lower than the power ($P_{EH}$) output by the power generation element 20.

Therefore, the power supply device 1 can increase the output voltage of the power generation element 20 to the voltage required by the load circuit 101. An operation of increasing the output voltage of the power generation element 20 to the voltage required by the load circuit 101 (a raising operation) is referred to as "assistance" in the present embodiment. That is, it can be said that the secondary battery 10 is an additional power supply or an adjustment power supply for raising the voltage.

The power supply device 1 includes the power generation element 20 that converts external energy into electrical energy and outputs the electrical energy as the voltage ($V_{EH}$), the secondary battery 10 that is connected in series with the power generation element 20 and outputs the voltage ($V_{BAT}$) higher than the voltage ($V_{EH}$), and the power conversion unit 50 that receives the voltage ($V_{EH}$) and the voltage ($V_{BAT}$) and outputs the power ($P_{OUT}$) to the load circuit 101. The power conversion unit 50 stores the total power ($P_{IN}$) based on the voltage ($V_{IN}$), which is a sum of the voltage ($V_{EH}$) and the voltage ($V_{BAT}$). The power conversion unit 50 distributes the total power ($P_{IN}$) as the output power ($P_{OUT}$) and the charging power ($P_{CHG}$). The power conversion unit 50 outputs the output power ($P_{OUT}$) to the load circuit 101 and outputs the charging power ($P_{CHG}$) to the secondary battery 10.

The power conversion unit 50 of the power supply device 1 receives the voltage ($V_{EH}$) output by the power generation element 20 and the voltage ($V_{BAT}$) output by the secondary battery 10. The power conversion unit 50 stores the total power ($P_{IN}$). The power conversion unit 50 distributes a part of the stored power as the output power ($P_{OUT}$). The total power ($P_{IN}$) is based on the voltage ($V_{IN}$), which is a sum of the voltage ($V_{EH}$) and the voltage ($V_{BAT}$). As a result, the output power ($V_{OUT}$) distributed from the total power ($P_{IN}$) can be output as a voltage higher than the voltage ($V_{EH}$). Therefore, the power supply device 1 can output a desired power to the load circuit 101.

The power conversion unit 50 includes the input terminal 50a for receiving the voltage ($V_{IN}$), the output terminal 50b for outputting the output power ($P_{OUT}$) by being connected to the load circuit 101, and the output terminal 50c for outputting the charging power ($P_{CHG}$) by being connected to the secondary battery 10. According to this configuration, it is possible to charge the secondary battery 10 with the charging power ($P_{CHG}$) obtained from the total power ($P_{IN}$). Therefore, it is possible to recover the power ($P_{BAT}$) used to increase the voltage ($V_{EH}$) of the power generation element 20. As a result, the power (PAT) required for an increase in the voltage ($V_{EH}$) of the power generation element 20 is substantially reduced. Therefore, it is possible to maintain a function of assisting the voltage ($V_{BAT}$) with the secondary battery 10 for a long period of time.

The output voltage ($V_{OUT}$) that defines the output power ($P_{OUT}$) is higher than the voltage ($V_{EH}$) and equal to or lower than the voltage ($V_{IN}$). According to this configuration, it is possible to output the output voltage ($V_{OUT}$) higher than the voltage ($V_{EH}$) and equal to or lower than the voltage ($V_{IN}$) to the load circuit 101.

The power generation element 20 outputs the output power ($P_{OUT}$). The output power ($P_{OUT}$) is smaller than the power ($P_{EH}$) defined by the voltage ($V_{EH}$). According to this configuration, the output power ($P_{OUT}$) consumed is smaller than the power ($P_{EH}$) output by the power generation element 20. As a result, the charging power ($P_{CHG}$) provided for charging the secondary battery 10 increases. Therefore, it is possible to maintain the function of assisting the voltage ($V_{EH}$) with the secondary battery 10 for a longer period of time.

The power conversion unit 50 includes the capacitor 51f that stores the total power ($P_{IN}$) by being connected to the input terminal 50a. According to this configuration, the power conversion unit 50 can suitably store the total power ($P_{IN}$).

Modification Example 1

The power supply device 1 of the first embodiment is not limited to the above configuration.

Figure 3:
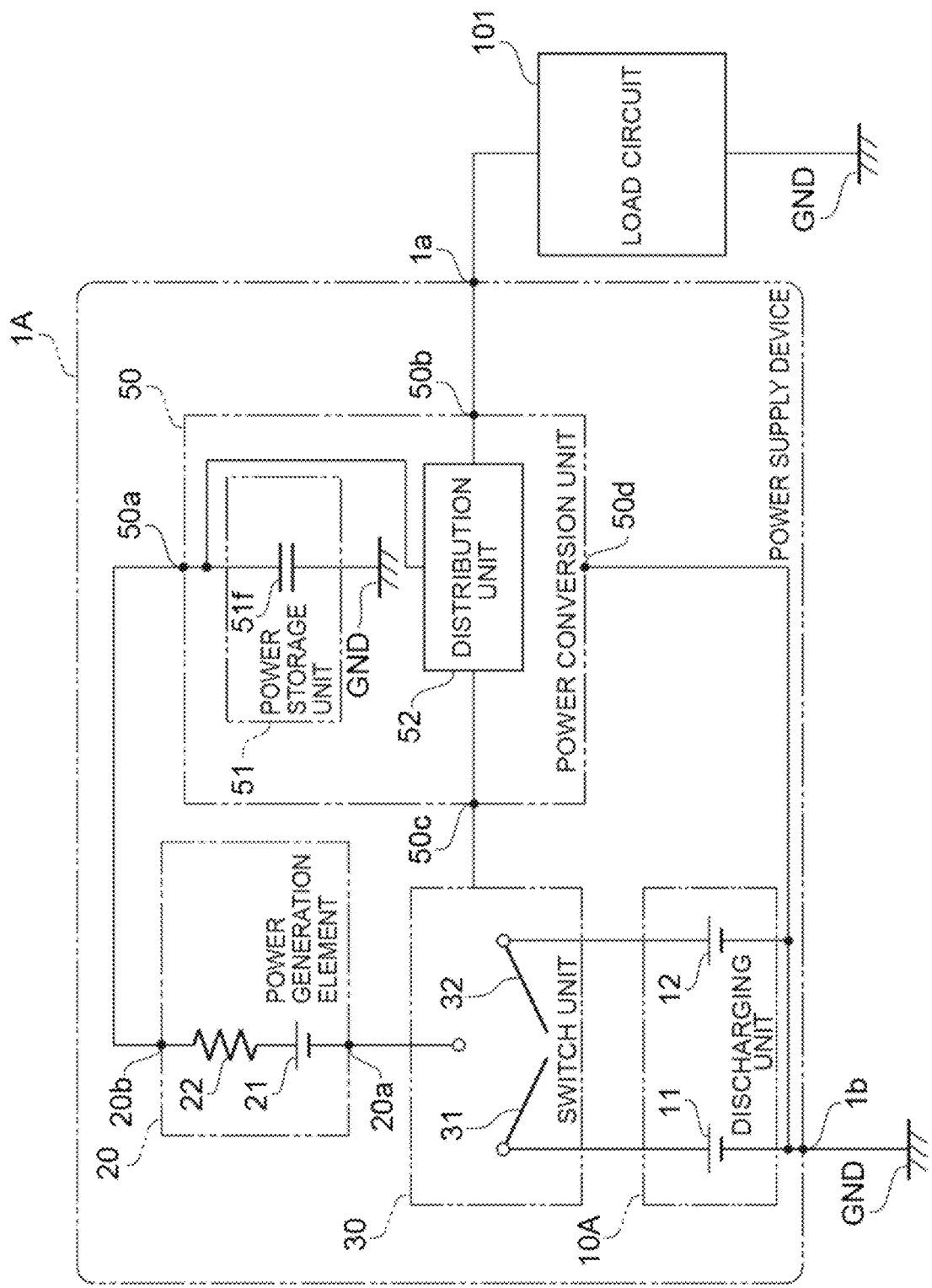
FIG. 3 is a diagram illustrating a configuration of a power supply device according to modification example 1.

For example, a power supply device 1A may have a configuration illustrated in FIG. 3. The power supply device 1A of modification example 1 differs from the power supply device 1 of the first embodiment in a configuration of the secondary battery 10. The power supply device 1A includes a charging and discharging unit 10A including secondary batteries 11 and 12, and a switch unit 30. The secondary battery 11 of the charging and discharging unit 10A may be used as a power supply for driving (assisting). The other secondary battery 12 may be used as a storage battery for charging. The switch unit 30 switches between a circuit that supplies power to the power generation element 20 and a circuit for charging the secondary battery 10 using the switches 31 and 32. Also with this configuration, it is possible to obtain the same operation and effect as those of the power supply device 1 of the first embodiment.

Second Embodiment

Figure 4:
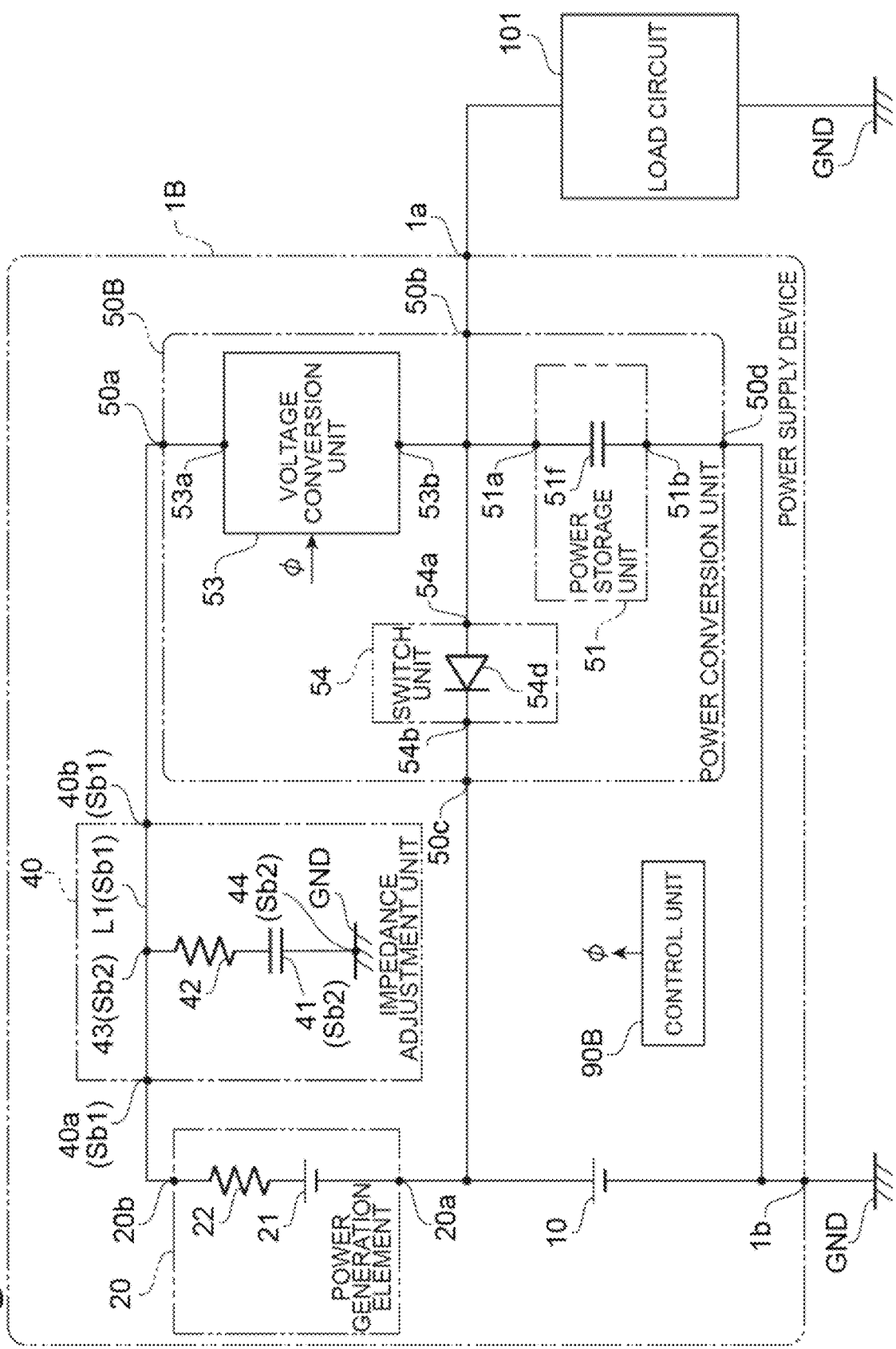
FIG. 4 is a diagram illustrating a configuration of a power supply device according to a second embodiment.

A power supply device 1B of a second embodiment illustrated in FIG. 4 will be described. The power supply device 1B of the second embodiment assists an output of the power generation element 20 with an output of the secondary battery 10, similar to the power supply device 1 of the first embodiment. As a result, the power supply device 1B can be regarded as a battery capable of outputting a predetermined power and voltage as an output. The power supply device 11B recovers the output of the secondary battery 10 used for assistance. As a result, it can be considered that, ideally, there is no energy consumption of the secondary battery 10. Substantially, very small energy consumption of the secondary battery 10 makes it possible to assist the power generation element 20. That is, the power supply device 1B can be regarded as a battery having an extended life as a whole.

The power supply device 1B of the second embodiment includes a secondary battery 10, a power generation element 20, an impedance adjustment unit 40, a power conversion unit 50B, and a control unit 90B. The power conversion unit 50B of the second embodiment is an example of a specific embodiment of the power conversion unit 50 of the first embodiment. The power supply device 11B of the second embodiment includes the impedance adjustment unit 40 as an additional element. The impedance adjustment unit 40 improves transfer efficiency of power from the power generation element 20 to the power conversion unit 50B. A configuration and operation of the secondary battery 10 and the power generation element 20 are the same as those in the first embodiment. Therefore, detailed description will be omitted. The impedance adjustment unit 40, the power conversion unit 50B, and the control unit 90B will be described in detail.

The impedance adjustment unit 40 includes an input terminal 40a, an output terminal 40b, a line L1, and a capacitor 41. The input terminal 40a is connected to the output terminal 20b of the power generation element 20. The input terminal 40a is connected to the output terminal 40b via the line L1. The output terminal 40b is connected to an input terminal 50a of the power conversion unit 50B. The capacitor 41 is connected between the line L1 and a ground potential GND.

The impedance adjustment unit 40 may be provided as necessary. The power supply device 1B may include the secondary battery 10, the power generation element 20, the power conversion unit SOB, and the control unit 90B.

The impedance adjustment unit 40 includes the capacitor 41 as a component. As a result, the impedance adjustment unit 40, ideally, may not consider an output resistor. In an actual circuit configuration, there is an output resistor 42. However, since the output resistor 42 has an extremely small resistance, the output resistor 42 can be considered to have a zero resistance.

The control unit 90B controls an operation of the power conversion unit 50B. Specifically, the control unit 90B controls start and stop of a transformation operation of the power conversion unit 50B. It is possible to switch between the charging operation and the discharging operation of the impedance adjustment unit 40 by controlling the operation of the power conversion unit 501B. Specifically, when the control unit 90B stops the operation of the power conversion unit 50B, the capacitor 41 is charged with the power output from the power generation element 20 (charging operation). An input impedance of the power conversion unit 50B can be regarded as substantially infinite in a state in which the operation of the power conversion unit 50B is stopped. In other words, the input impedance of the power conversion unit 50B is in a high impedance state. On the other hand, when the control unit 90B starts the operation of the power conversion unit 50B, power is supplied from the capacitor 41 to the power conversion unit 50B (discharging operation). The input impedance of the power conversion unit 50B can be regarded as being in a low impedance state in a state in which the power conversion unit 50B is operating. A power may be output from the power generation element 20 during the discharging operation. In this case, the power from the power generation element 20 is also output to the power conversion unit 50B. However, the operation of the power conversion unit 50B is governed by a power output from the capacitor 41.

The power conversion unit 50B includes a voltage conversion unit 53, a power storage unit 51, and a switch unit 54.

The voltage conversion unit 53 converts a voltage output from the impedance adjustment unit 40 to a different voltage. The voltage conversion unit 53 is a DC/DC converter. Specifically, the voltage conversion unit 53 steps down the voltage to a voltage lower than the voltage output from the impedance adjustment unit 40. The voltage conversion unit 53 switches between start and stop of a voltage conversion operation depending on a control signal φ output from the control unit 90B. An input terminal 53a of the voltage conversion unit 53 is connected to the input terminal 50a of the power conversion unit 50B. An output terminal 53b of the voltage conversion unit 53 is connected to the power storage unit 51. The output terminal 53b of the voltage conversion unit 53 is also connected to the switch unit 54. Further, the output terminal 53b is also connected to an output terminal 50b of the power conversion unit 50B.

The power storage unit 51 receives the stepped-down voltage from the voltage conversion unit 53. The power storage unit 51 outputs the power to the load circuit 101 in response to a request from the load circuit 101. The power storage unit 51 includes the capacitor 51f as a component. One terminal 51a of the capacitor 51f is connected to the voltage conversion unit 53. One terminal 51b of the capacitor 51f is also connected to the switch unit 54. Further, the one terminal S1b is also connected to the output terminal 50b. The other terminal of the power storage unit 51 is connected to the ground terminal 50d.

The switch unit 54 allows the power storage unit 51 to supply current to the secondary battery 10. The switch unit 54 prohibits a flow of current from the secondary battery 10 to the power storage unit 51. The switch unit 54 outputs the power stored in the power storage unit 51 to the secondary battery 10 when a predetermined condition is satisfied. The switch unit 54 includes a diode 54d as a component. For example, a forward voltage of the diode 54d may be equal to the voltage ($V_{BAT}+\Delta V$). An input terminal 54a of the switch unit 54 is connected to the power storage unit 51. The input terminal 54a of the switch unit 54 is connected to the voltage conversion unit 53. Further, the input terminal 54a is also connected to the output terminal 50b. An output terminal 54b of the switch unit 54 is connected to the output terminal 50c of the power conversion unit 50.

The power supply device 1B operates while switching between charging and outputting. The voltage conversion unit 53 decreases the voltage ($V_{IN}$) to the voltage ($V_{BAT}+\Delta V$). The voltage ($V_{BAT}+\Delta V$) is equal to or higher than the voltage ($V_{BAT}$) and equal to or smaller than a voltage ($V_{BAT}+V_{EH}$).

When the load circuit 101 does not request the power ($P_{OUT}$), the power storage unit 51 stores the power output by the voltage conversion unit 53. As a result, a voltage at the terminal 51a increases. When the voltage at the terminal 51a becomes higher than a forward voltage of the diode 54d, a current flows from the power storage unit 51 to the secondary battery 10. In other words, the secondary battery 10 is charged. When the voltage at the terminal 51a becomes lower than the forward voltage of the diode 54d, the recovery of power from the power storage unit 51 to the secondary battery 10 stops. Since the power output by the voltage conversion unit 53 is stored in the power storage unit 51 again, the voltage at the terminal 51a increases.

When the load circuit 101 requests power, the power storage unit 51 outputs the stored power to the load circuit 101. The voltage at the terminal 51a is equal to or higher than $V_{BAT}$ and equal to or lower than $V_{OUT}$ while the power is being supplied. In this case, the diode 54d is in an off state. In this case, the recovery of the power to the secondary battery 10 is not performed. When the voltage at the terminal 51a can hold $V_{OUT}$ even while the power is being supplied, the diode 54d is in an ON state. In this case, the recovery of the power to the secondary battery 10 is performed.

Figure 5:
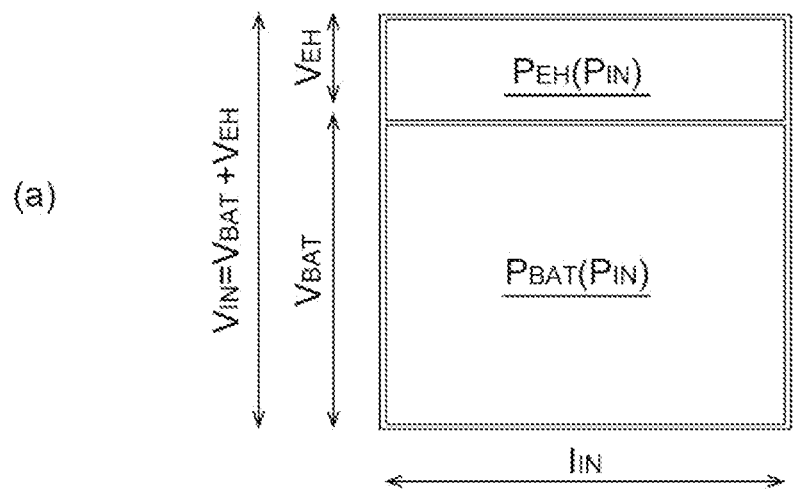
FIGS. 5(*a*) and 5(*b*) are diagrams illustrating an operation of the power supply device illustrated in FIG. 4.
Figure 5:
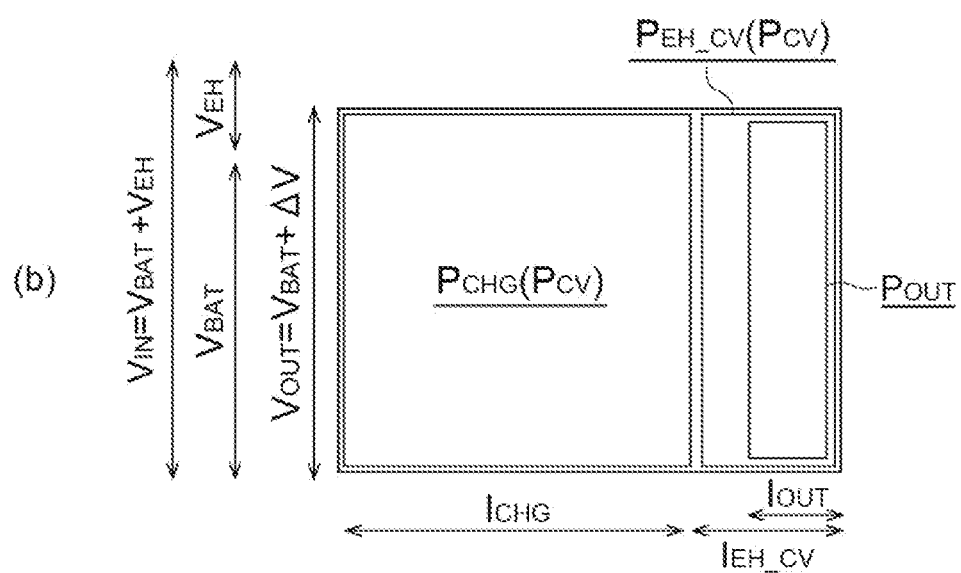

An operating principle of the power supply device 1B will be described with reference to FIG. 5.

The voltage conversion unit 53 receives the voltage ($V_{BAT}$) and the voltage ($V_{EH}$). The voltage conversion unit 53 receives the current ($I_{IN}$). As illustrated in a part (a) of FIG. 5, the voltage conversion unit 53 receives the total power ($P_{IN}$). A breakdown of the total power ($P_{IN}$) is the same as the content described in the first embodiment. The total power ($P_{IN}$) is a sum of the power ($P_{BAT}$) that is output by the secondary battery 10 and the power ($P_{EH}$) that is output by the power generation element 20. A definition of the total power ($P_{IN}$) is $P_{IN}=(V_{BAT}+V_{EH}) \times I_{IN}$.

As illustrated in FIG. 5(b), the voltage conversion unit 53 decreases the voltage ($V_{BAT}+V_{EH}$) regarding the total power ($P_{IN}$). The voltage output by the voltage conversion unit 53 is the voltage ($V_{OUT}$) output by the power supply device 1B. The voltage ($V_{OUT}$) is higher than the voltage ($V_{BAT}$) output by the secondary battery 10. The voltage ($V_{OUT}$) is lower than the total voltage ($V_{BAT}+V_{EH}$). The voltage ($V_{OUT}$) is shown as $V_{OUT}=V_{BAT}+\Delta V$. The voltage ($\Delta V$) is equal to or higher than zero. The voltage ($\Delta V$) is equal to or lower than the voltage ($V_{EH}$). By design, the voltage required by the load circuit 101 is set first. In other words, the voltage ($V_{OUT}$) to be output by the power supply device 1B is set first. Therefore, the voltage of the secondary battery 10 may be set depending on the required voltage.

It is assumed that power conversion efficiency ($\eta$) of the power conversion unit 50B is 100%. Then, the power ($P_{IN}$) input to the voltage conversion unit 53 and the power (Pc % v) to be output are equal to each other. For example, an area of a rectangle illustrated in FIG. 5(a) and an area of a rectangle illustrated in FIG. 5(b) are equal to each other. On the other hand, when attention to a voltage is paid, the voltage ($V_{BAT}+V_{EH}$) input to the voltage conversion unit 53 decreases to the voltage ($V_{BAT}+\Delta V$). When there is no power loss due to the conversion ($\eta=100\%$), the current increases in correspondence to voltage drop. The power ($P_{CNV}$) to be output can be shown as $P_{CNV}=V_{OUT}\times(I_{CHG}+I_{EH\_CV})$.

Attention to the power ($P_{EH}$) that is output by the power generation element 20 is paid. When the power conversion efficiency ($\eta$) is 100%, power ($P_{EH\_CV}$) caused by the power ($P_{EH}$) in the power ($P_{CNV}$) output by the voltage conversion unit 53 can be set. The voltage conversion unit 53 outputs the voltage ($V_{OUT}$). Therefore, a current ($I_{EH\_CV}$) constituting the power ($P_{EH\_CV}$) is $I_{EH\_CV}=P_{EH\_CV}/V_{OUT}$.

When the load circuit 101 requests the power ($P_{OUT}$), the power supply device 1B provides a current ($I_{OUT}=P_{OUT}/V_{OUT}$) to the load circuit 101. When the current ($I_{OUT}$) is lower than the current ($I_{EH\_CV}$) ($I_{OUT}<I_{EH\_CV}$), the power conversion unit 50B can return, to the secondary battery 10, a current ($I_{CHG}$) higher than the current ($I_{IN}$) input to the power conversion unit 50B. That is, it is possible to recover the power of the secondary battery 10 used to assist the power generation element 20.

In short, a point of an operation of the power supply device 1B is to increase the current by decreasing the voltage ($V_{BAT}+V_{EH}$) input to the voltage conversion unit 53. A part of the current is output to the load circuit 101. The rest of the current is returned to the secondary battery 10. The power ($P_{CHG}$) that can be recovered to the secondary battery 10 is determined depending on the power conversion efficiency ($\eta$) and the power ($P_{OUT}$) required by the load circuit 101. Depending on the power ($P_{OUT}$) required by the load circuit 101, it is possible to recover a power higher than the power ($P_{BAT}$) used for assistance. That is, in the secondary battery 10, a difference between the output power ($P_{BAT}$) and the recovered power ($P_{CHG}$) is net power consumption. When the recovered power ($P_{CHG}$) is higher, the net power consumption is lower. As a result, the life of the secondary battery 10 is extended.

The power supply device 1B includes the power generation element 20 that outputs electrical energy as the voltage ($V_{EH}$) by converting external energy into the electrical energy, the secondary battery 10 that is connected in series with the power generation element 20 and outputs the voltage ($V_{BAT}$) higher than the voltage ($V_{EH}$), and the power conversion unit 50B that receives the voltage ($V_{EH}$) and the voltage ($V_{BAT}$) and outputs the power ($P_{OUT}$) to the load circuit 101. The power conversion unit 50B includes the voltage conversion unit 53 connected in series with the power generation element 20 and the secondary battery 10, the power storage unit 51 connected to the voltage conversion unit 53, the output terminal 50b that connects the power storage unit 51 to the load circuit 101, and the output terminal 50c that connects the power storage unit 51 to the secondary battery 10. The voltage ($V_{BAT}$) may be lower than the voltage ($V_{EH}$). That is, an effect of the power supply device 1B is achieved regardless of a magnitude relationship between the voltage ($V_{BAT}$) and the voltage ($V_{EH}$).

The power conversion unit 50B of the power supply device 1B receives the voltage ($V_{EH}$) output by the power generation element 20 and the voltage ($V_{BAT}$) output by the secondary battery 10. The power conversion unit 50B includes the voltage conversion unit 53. Therefore, it is possible to decrease the total voltage ($V_{IN}$), which is the sum of the voltage ($V_{EH}$) and the voltage ($V_{BAT}$). As a result, it is possible to increase the current ($I_{IN}$) received by the power conversion unit 50B depending on step-down of the total voltage ($V_{IN}$). By decreasing the total voltage ($V_{IN}$) and increasing the current, the power conversion unit 50B can output the power ($P_{OUT}$) to the load circuit 101 and output the power ($P_{CHG}$) to the secondary battery 10. The power ($P_{IN}$) stored in the power storage unit 51 is based on the total voltage ($V_{IN}$), which is the sum of the voltage ($V_{EH}$) and the voltage ($V_{BAT}$). As a result, the output power ($P_{OUT}$) distributed from the power ($P_{IN}$) stored in the power storage unit 51 can be the voltage ($V_{BAT}+\Delta V$) higher than the voltage ($V_{EH}$). Therefore, the power supply device 1B can output the desired power to the load circuit 101. Further, the charging power ($P_{CHG}$) is output to the secondary battery 10. As a result, power required to increase the voltage ($V_{EH}$) of the power generation element 20 is substantially reduced. That is, with the secondary battery 10, it is possible to maintain the function of assisting the voltage ($V_{EH}$) for a long period of time.

The voltage conversion unit 53 receives the voltage ($V_{EH}$) from the power generation element 20 and the voltage ($V_{BAT}$) from the secondary battery 10. The voltage conversion unit 53 converts the total voltage ($V_{IN}$), which is a sum of the voltage ($V_{EH}$) and the voltage ($V_{BAT}$), to the output voltage ($V_{BAT}+\Delta V$) that is equal to or higher than the voltage ($V_{BAT}$) and equal to or lower than the voltage ($V_{IN}$). According to this configuration, it is possible to output the output voltage ($V_{BAT}+\Delta V$) that is equal to or higher than the voltage ($V_{BAT}$) and equal to or lower than the total voltage ($V_{IN}$) to the load circuit 101.

The power storage unit 51 stores the power ($P_{CNV}$) based on the output voltage ($V_{BAT}+\Delta V$). According to this configuration, it is possible to output the output voltage ($V_{BAT}+\Delta V$) from the power storage unit 51 to the load circuit 101.

The switch unit 54 can switch between a charging state in which the power ($P_{OUT}$) is supplied from the power storage unit 51 to the secondary battery 10 and a non-charging state in which the supply of the power from the power storage unit 51 to the secondary battery 10 stops. According to this configuration, it is possible to perform an operation of increasing the power stored in the power storage unit 51 with the passage of time when the power ($P_{EH}$) output from the power generation element 20 is low, in addition to the operation of supplying power ($P_{OUT}$) to the load circuit 101.

One terminal of the secondary battery 10 is connected to the ground potential GND. The other terminal of the secondary battery 10 is connected to the power generation element 20. The other terminal of the secondary battery 10 is also connected to the power conversion unit 50B. One terminal of the power generation element 20 is connected to the secondary battery 10. The other terminal of the power generation element 20 is connected to the power conversion unit 50B. According to this configuration, the secondary battery 10 can be suitably charged.

The power supply device 1B further includes the impedance adjustment unit 40 installed before the power conversion unit 50B. The impedance adjustment unit 40 includes a first circuit unit Sb1 having an input terminal 40a connected to the power generation element 20 and an output terminal 40b connected to the power conversion unit 50B, and a second circuit unit Sb2 having a connection point 43 (a first connection point) connected to the first circuit unit Sb1, a connection point 44 (a second connection point) connected to the ground potential GND, and the capacitor 41 connected between the connection point 43 and the connection point 44. A resistance of the output resistor 42 included in the second circuit unit Sb2 is smaller than that of the output resistor 22 included in the power generation element 20.

According to this configuration, the capacitor 41 of the second circuit unit Sb2 included in the impedance adjustment unit 40 is charged with the power received from the power generation element 20 via the input terminal 40a of the first circuit unit Sb1. The capacitor 41 transfers the power to the power conversion unit 50B via the output terminal 40b of the first circuit unit Sb1. As a result, when the power is transferred to the power conversion unit 50B, the capacitor 41 is seen as a power source instead of the power generation element 20. The output resistor 42 between the capacitor 41 and the output terminal 40b has a smaller resistance than the output resistor 22 of the power generation element 20.

As a result, it is possible to curb drop of voltage occurring in the power transferred to the power conversion unit 50B, as compared with a configuration in which the power generation element 20 is directly connected to the power conversion unit 50B. Therefore, it is possible to perform efficient transfer of the power ($P_{IN}$).

In other words, in order to operate the power conversion unit 50B, it is necessary to generate a predetermined current according to a predetermined voltage required by the load circuit 101. When the power generation element 20 is directly connected to the power conversion unit 50B, the voltage output to the power conversion unit SOB decreases due to a high output impedance (output resistor 22) of the power generation element 20. As a result, an output current that could be output when there was no voltage drop decreases greatly. On the other hand, it is possible to realize an ideal state in which the impedance is zero by using the impedance adjustment unit 40. As a result, it becomes possible to output the power to the power conversion unit 50B in an ideal state.

Third Embodiment

Figure 6:
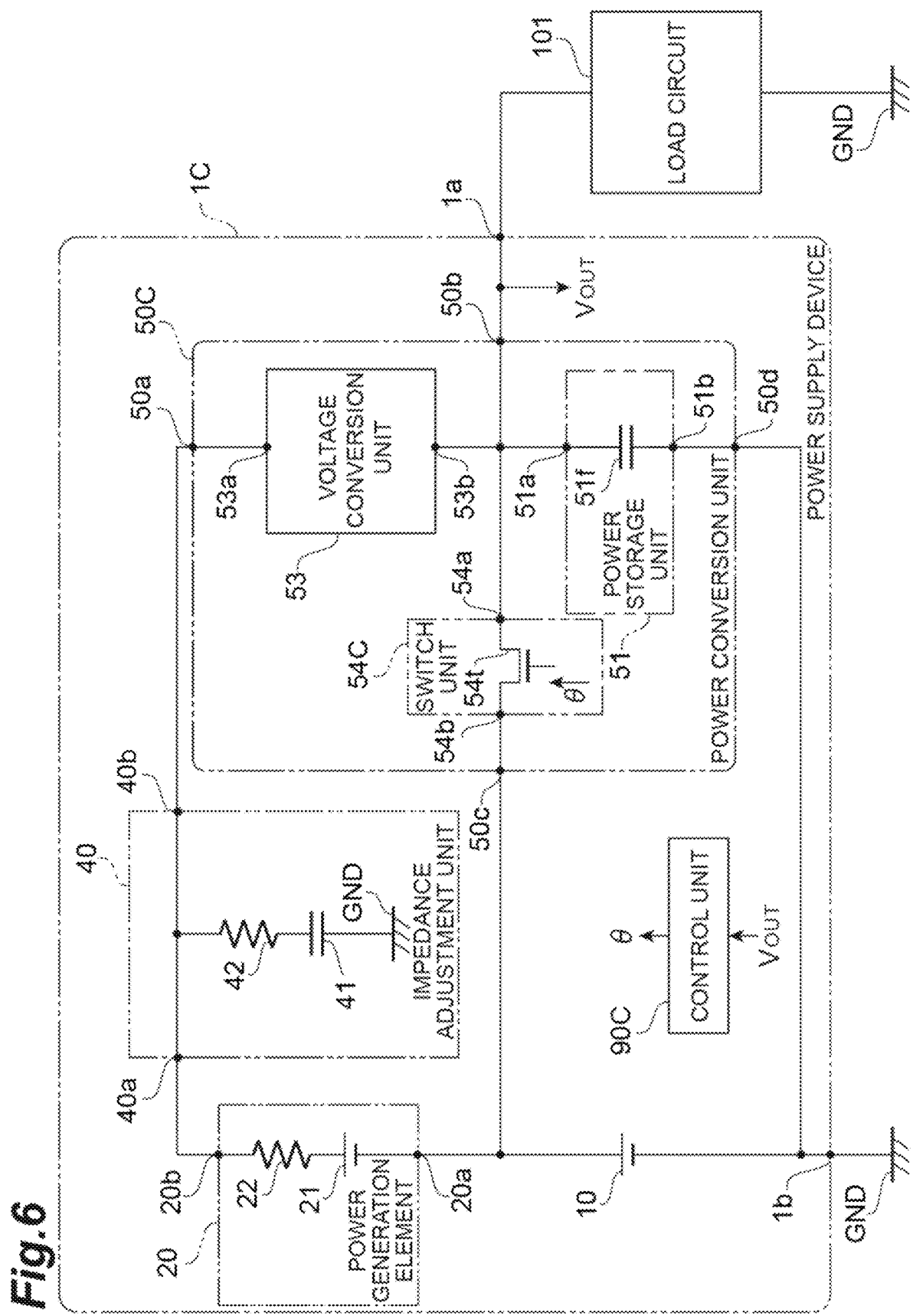
FIG. 6 is a diagram illustrating a configuration of a power supply device according to a third embodiment.

A power supply device 1C of a third embodiment illustrated in FIG. 6 will be described. The power supply device 1C of the third embodiment differs from the power supply device 1B of the second embodiment in that a switch unit 54C is configured of a transistor 54t. Control for transferring power from the power storage unit 51 to the secondary battery 10 is performed by the transistor 54t instead of the diode 54d. A configuration and operation of the secondary battery 10, the power generation element 20, the impedance adjustment unit 40, the voltage conversion unit 53, and the power storage unit 51 are the same as those in the second embodiment. Therefore, detailed description will be omitted. Hereinafter, the switch unit 54C will be described in detail.

Figure 7:
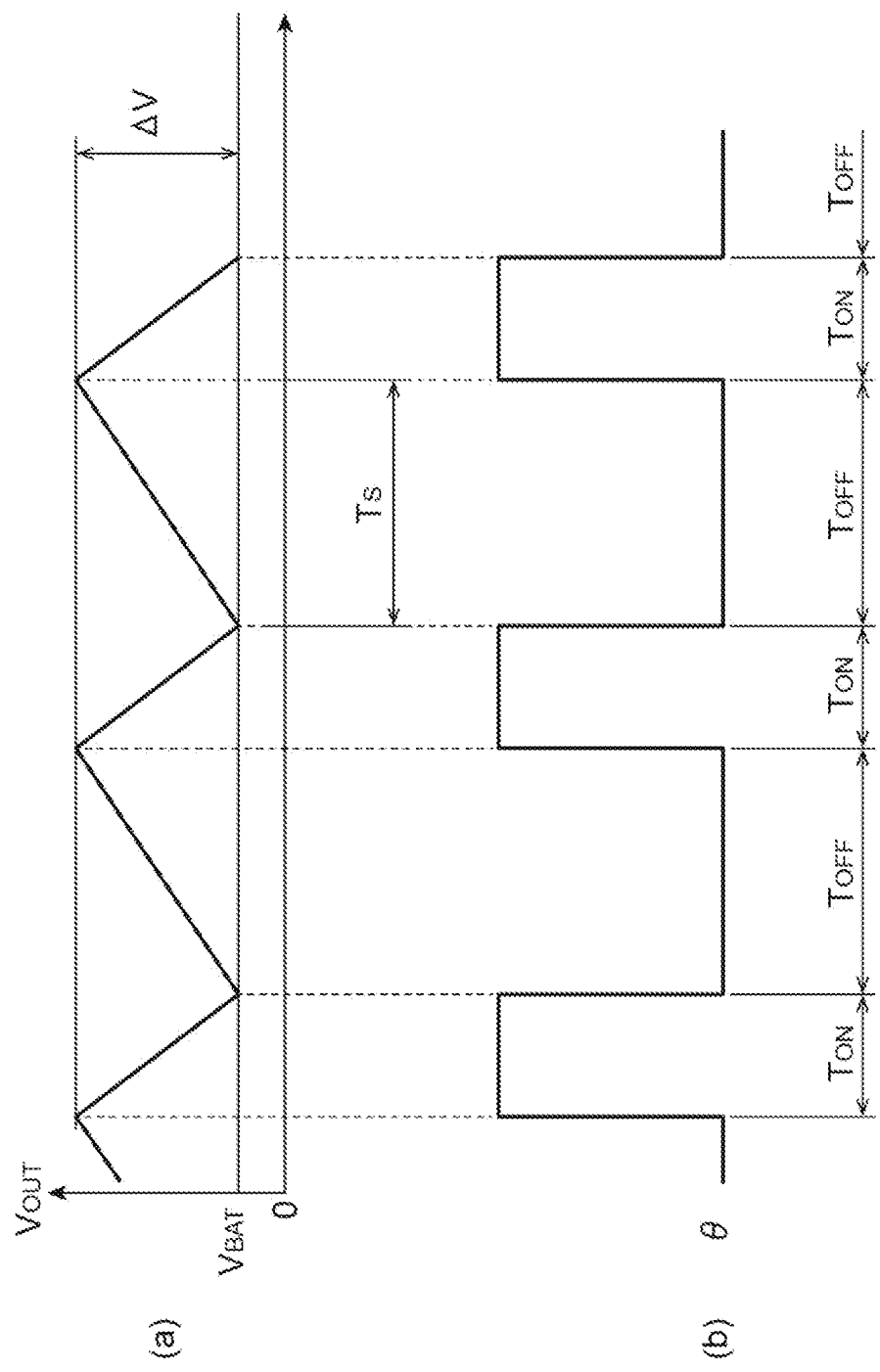
FIGS. 7(*a*) and 7(*b*) illustrate a voltage output by the power supply device illustrated in FIG. 6 and a control signal output by a control unit.

A field effect transistor (MOSFET) may be used as the transistor 54t of the switch unit 54C. A source of the transistor 54t is an input terminal 54a of the switch unit 54C. The source of the transistor 54t is connected to the power storage unit 51. A drain of the transistor 54t is the output terminal 54b of the switch unit 54. A drain of the transistor 54t is connected to an output terminal 50c of a power conversion unit 50C. A gate of the transistor 54t receives a control signal θ from the control unit 90C. The transistor 54t controls start and stop of charging of the secondary battery 10 depending on the control signal θ output to the gate. The control unit 90C outputs the control signal θ illustrated in FIG. 7 to the gate of the transistor 54t. In a period $T_{ON}$, the control unit 90C causes power to be supplied to the secondary battery 10. In a period $T_{OFF}$, the control unit 90C stops the supply of power to the secondary battery 10.

For example, as illustrated in FIGS. 7(a) and 7(b), the control unit 90C generates a control signal θ on the basis of the voltage ($V_{OUT}$) generated at the output terminal 50b.

FIG. 7(a) illustrates the voltage ($V_{OUT}$) of the output terminal 50b. FIG. 7(b) illustrates the control signal θ output by the control unit 90C.

A case in which the load circuit 101 does not require power will be described. In the following description, it is assumed that the voltage conversion unit 53 is operating. The power stored in the power storage unit 51 increases with the passage of time. As a result, the voltage ($V_{OUT}$) generated at the output terminal 50b gradually increases. During this period, the control unit 90C outputs a control signal θ<LOW> to the transistor 54t. When the control unit 90C detects that the voltage ($V_{OUT}$) has reached the voltage ($V_{BAT}+\Delta V$), the control unit 90C outputs a control signal θ<HIGH> to the transistor 54t. As a result, charging of the secondary battery 10 from the power storage unit 51 is started. Thereafter, the voltage ($V_{OUT}$) generated at the output terminal 50b decreases with the passage of time. In this period, the control unit 90C continues to output the control signal θ<HIGH>. When the control unit 90C detects that the voltage ($V_{OUT}$) has decreased to the voltage ($V_{BAT}$), the control unit 90C outputs the control signal θ<LOW> to the transistor 54t. As a result, the charging from the power storage unit 51 to the secondary battery 10 is stopped. Thereafter, the voltage ($V_{OUT}$) generated at the output terminal 50b gradually increases with the passage of time.

An operation when the load circuit 101 requests power is the same as the case of the second embodiment. When the load circuit 101 requires power, the control unit 90C outputs the control signal θ<LOW> to the gate of the transistor 54t. Therefore, the transistor 54t is in an off state. That is, the recovery of the power to the secondary battery 10 is not performed.

The power supply device 1C of the third embodiment can continue to output a desired power for a long period of time, similar to the power supply device 1B of the second embodiment.

The power supply device 1C of the third embodiment switches between a charging operation for the secondary battery 10 and a charging operation for the power storage unit 51 using the transistor 54t. Therefore, it is possible to perform switching control using a desired parameter that can be acquired in the circuit. An example of the desired parameter that can be acquired in the circuit can be a voltage generated at the output terminal 50b.

Fourth Embodiment

A power supply device 1D of a fourth embodiment illustrated in FIG. 8 will be described. The power supply device 1D of the fourth embodiment includes a secondary battery 10, a power generation element 20, an impedance adjustment unit 40, a power conversion unit 50D, and a control unit 90D. The control unit 90D of the power supply device 1D of the fourth embodiment controls the voltage conversion unit 53D by using a voltage ($V_{OUT}$) generated at the output terminal 50b of the power conversion unit 50). A configuration and operation of the secondary battery 10, the power generation element 20, and the impedance adjustment unit 40 are the same as those in the second embodiment. Therefore, detailed description will be omitted. Hereinafter, the voltage conversion unit 53D and the control unit 90D will be described in detail.

The voltage conversion unit 53D intermittently sends a voltage received from an input terminal 53a to an output terminal 53b. As a result, a stepped-down voltage is generated at the output terminal 53b as an average of the sent voltage. The voltage conversion unit 53D includes the input terminal 53a, the output terminal 53b, and an output terminal 53c. The input terminal 53a is connected to an input terminal 50a of the power conversion unit 50D. The output terminal 53b is connected to the output terminal 50b of the power conversion unit 50D. The output terminal 53b is also connected to the capacitor 51f. The output terminal 53c is connected to an output terminal 50c of the power conversion unit 50D.

The input terminal 53a of the voltage conversion unit 53D receives a voltage ($V_{IN}$). The voltage conversion unit 53D decreases the received voltage ($V_{IN}$) to a voltage ($V_{CNV}$: fourth voltage). The voltage conversion unit 53D outputs the voltage ($V_{CNV}$) to any one of the output terminals 53b and 53c. A step-down operation in the voltage conversion unit 53D and a selection operation of the output terminals 53b and 53c are controlled by control signals φ1, φ2, φ3, and φ4 output from the control unit 90D.

Specifically, the voltage conversion unit 53D includes a step-down DC/DC converter 53v, and switches 53s3 and 53s4. The DC/DC converter 53v is a chopper type circuit. The DC/DC converter 53v includes switches 53s1 and 53s2, a coil 53h, and a capacitor 53f. A voltage received from the input terminal 53a is decreased by an ON/OFF operation of the switches 53s1 and 53s2. The operations of the switches 53s1 and 53s2 follow the control signals φ1 and φ2 output from the control unit 90D. The DC/DC converter 53v outputs a voltage to any one of the switch 53s3 and the switch 53s4. The switch 53s3 is connected to the DC/DC converter 53v. The switch 53s3 is also connected to the output terminal 53b. The switch 53s4 is connected to the DC/DC converter 53v. The switch 53s4 is also connected to the output terminal 53c. Operations of the switches 53s3 and 53s4 are operations of selecting a voltage output destination. The operations of the switches 53s3 and 53s4 follow the control signals φ3 and φ4 output from the control unit 90D.

Figure 8:
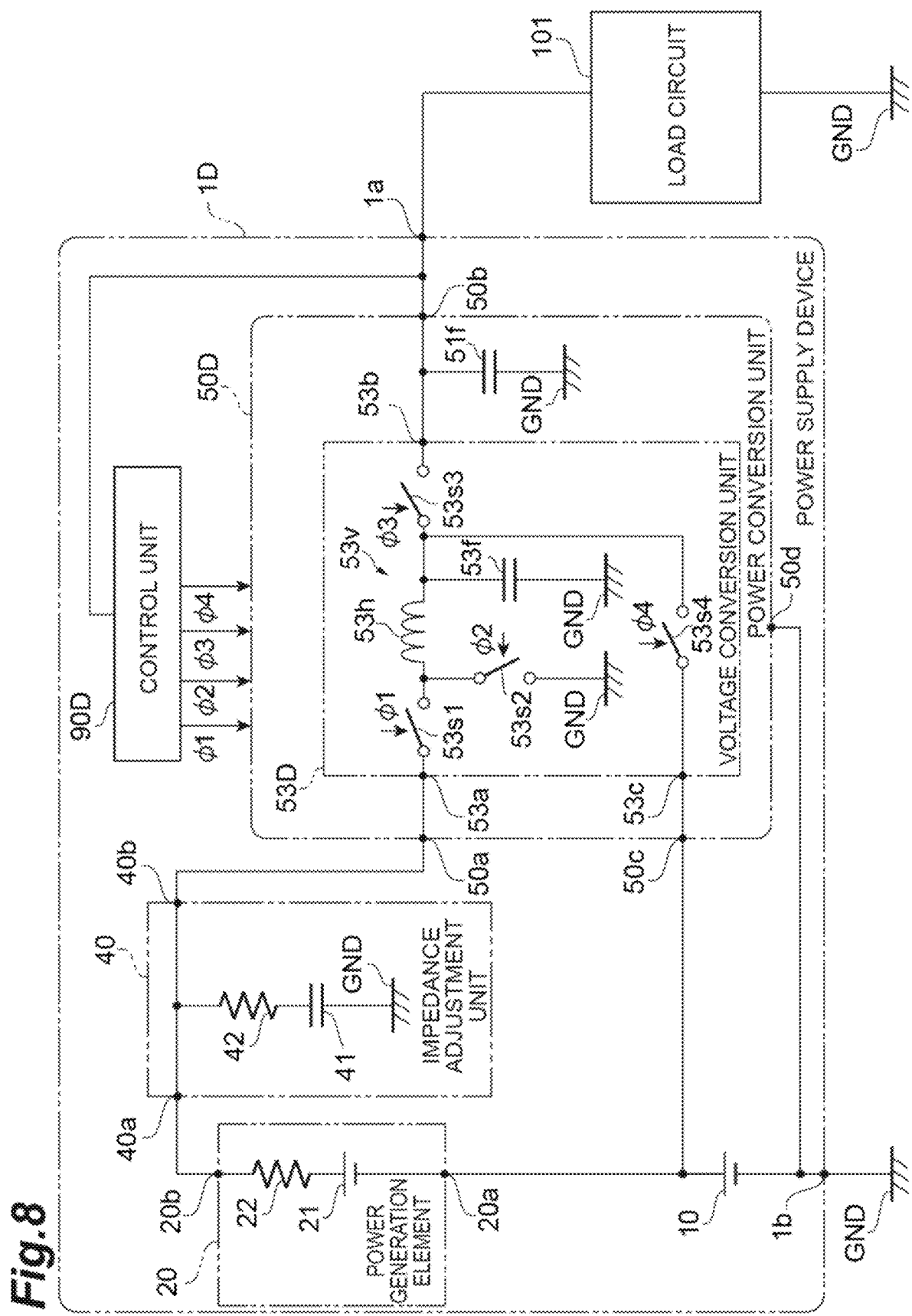
FIG. 8 is a diagram illustrating a configuration of a power supply device according to a fourth embodiment.

A circuit configuration of the voltage conversion unit 53D illustrated in FIG. 8 is an example. The circuit configuration of the voltage conversion unit 53D is not limited to the circuit configuration illustrated in FIG. 8.

The control unit 90D monitors the voltage ($V_{OUT}$) generated at the output terminal 50b. The control unit 90D generates the control signals φ1, φ2, φ3, and φ4 on the basis of the voltage ($V_{OUT}$). The control unit 90D outputs the control signals φ1, φ2, φ3, and φ4 to the voltage conversion unit 53.

The voltage conversion unit 53D selects any one of a charging operation of the capacitor 51f or a charging operation of the secondary battery 10 depending on the voltage ($V_{OUT}$) generated at the output terminal 50b.

When the voltage ($V_{OUT}$) is low, the control unit 90D performs the charging operation of the capacitor 51f illustrated in FIG. 9(a). The control unit 90D outputs the control signal φ3 for making the switch 53s3 conductive and the control signal φ4 for disconnecting the switch 53s4. The control unit 90D outputs the control signals φ1 and φ2 for a step-down operation to the switches 53s1 and 53s2. As a result, a stepped-down voltage ($V_{CNV}$) is output to the capacitor 51f via the output terminal 53b. That is, the capacitor 51f is charged.

When the voltage ($V_{OUT}$) is high, the control unit 90D performs the charging operation of the secondary battery 10 illustrated in FIG. 9(b). The control unit 90D outputs the control signal φ4 for making the switch 53s4 conductive and the control signal φ3 for disconnecting the switch 53s3. The control unit 90D outputs the control signals φ1 and φ2 for a step-down operation to the switches 53s1 and 53s2. As a result, the stepped-down voltage ($V_{CNV}$) is output to the secondary battery 10 via the output terminal 53c. That is, the secondary battery 10 is charged.

Figure 9:
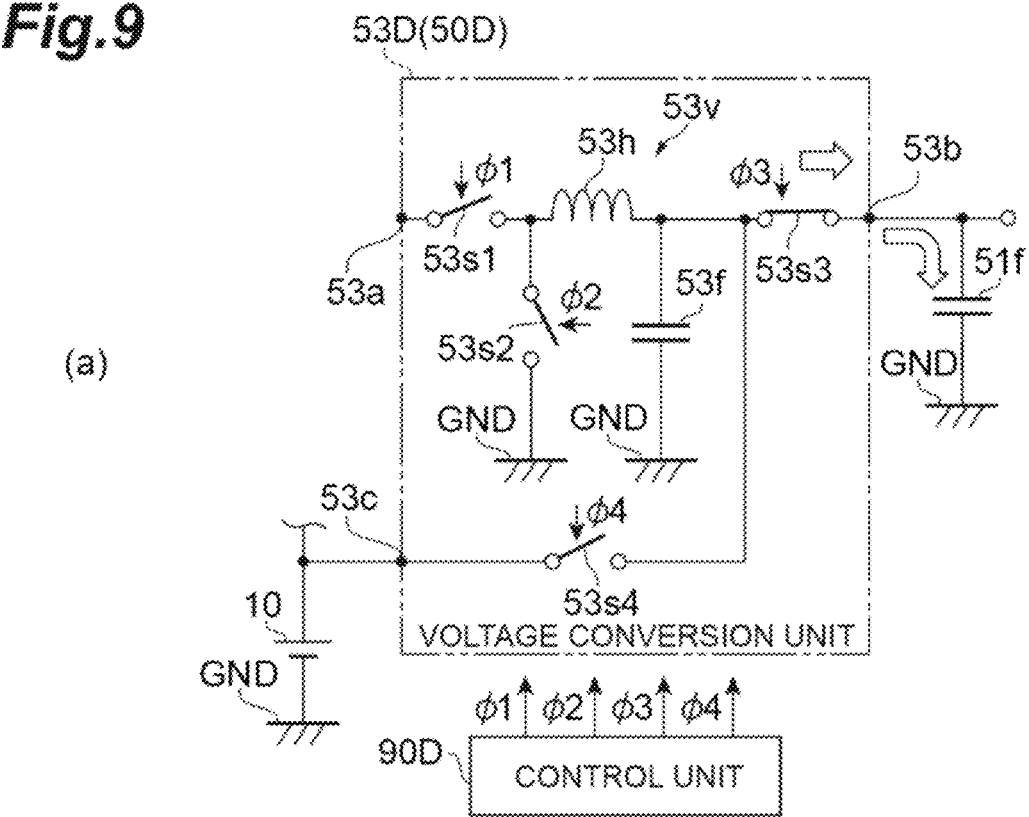
FIG. 9(*a*) is a diagram illustrating a charging operation of a capacitor.
Figure 9:
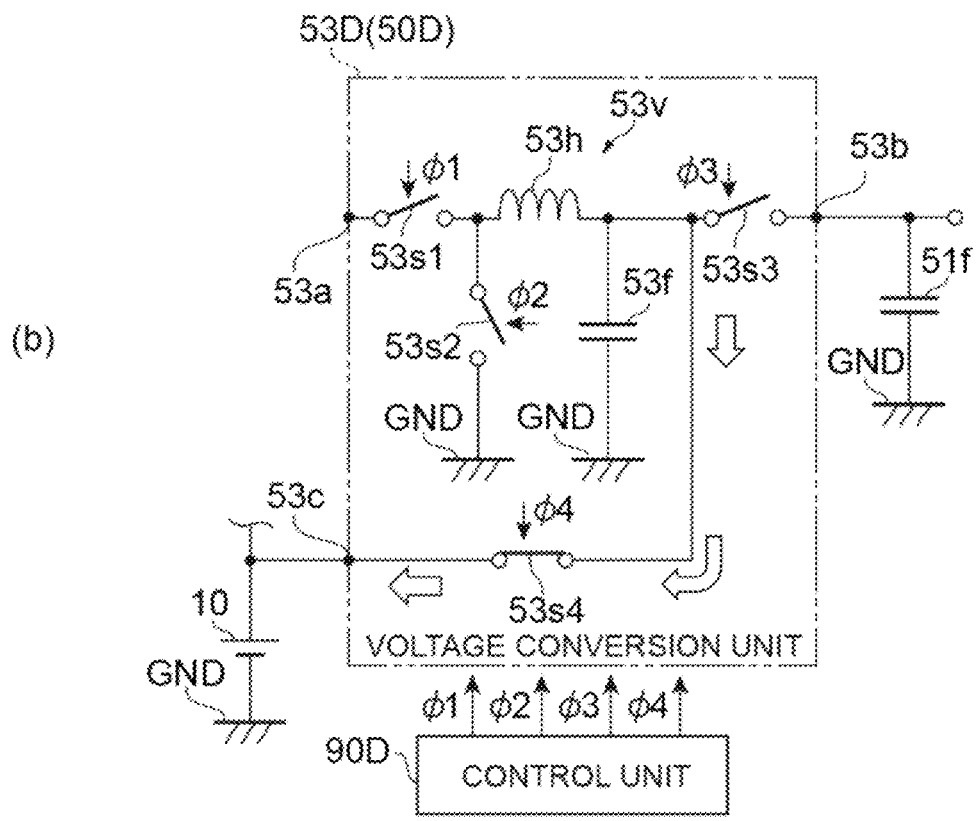
Figure 10:
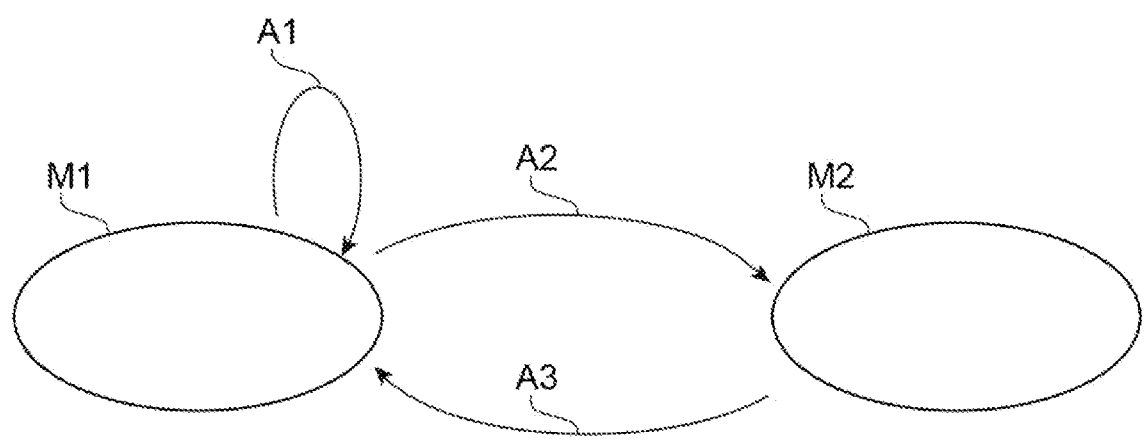
FIG. 10 is a diagram illustrating an operation of the power supply device illustrated in FIG. 8.

As illustrated in FIG. 10, when the voltage ($V_{OUT}$) is lower than a required voltage ($V_T$), the control unit 90D continues a charging operation M1 (a first operation mode: see a part (a) of FIG. 9) of the capacitor 51f (operation A1). When the voltage ($V_{OUT}$) becomes higher than the required voltage ($V_T$) due to the charging operation of the capacitor 51f, the control unit 90D performs switching from the charging operation M1 (the first operation mode) of the capacitor 51f to the charging operation M2 (a second operation mode: see FIG. 9(b)) of the secondary battery 10 (operation A2). Thereafter, when the voltage ($V_{OUT}$) is higher than the required voltage ($V_T$), the control unit 90D continues the charging operation M2 (the second operation mode) of the secondary battery 10. When the voltage ($V_{OUT}$) becomes lower than the required voltage (VT), the control unit 90D performs switching from the charging operation M2 (the second operation mode) of the secondary battery 10 to the charging operation M1 (the first operation mode) of the capacitor 51f. (Operation A3).

The power supply device 1D of the fourth embodiment can continue to output a desired power for a long period of time, similar to the power supply device 1B of the second embodiment.

Modification Example 2

Figure 11:
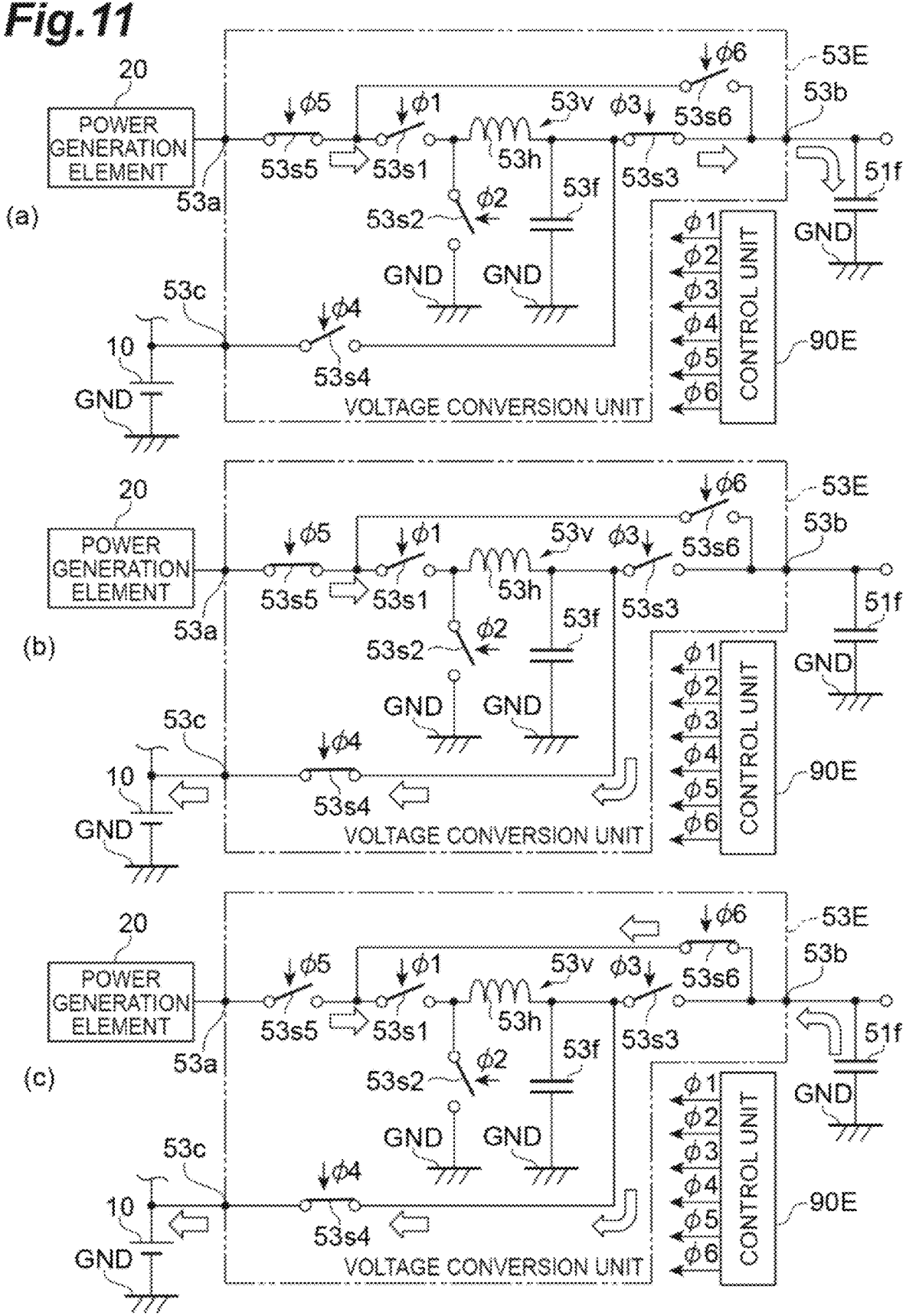
FIGS. 11(*a*), 11(*b*), and 11(*c*) are diagrams illustrating an operation of a power supply device of modification example 2.

In the fourth embodiment, the voltage output from the power generation element 20 is used in the charging operation of the secondary battery 10. For example, the voltage output from the capacitor 51f may be used in the charging operation of the secondary battery 10. In this case, a voltage conversion unit 53E may have three connection configurations. FIGS. 11(a), 11(b), and 11(c) show examples of the three connection configurations.

The voltage conversion unit 53E of modification example 2 is obtained by adding switches 53s5 and 53s6 to the circuit configuration of the voltage conversion unit 53D of the fourth embodiment. The switch 53s5 is disposed between the input terminal 53a and the switch 53s1. The switch 53s6 is disposed between the capacitor 51f and the switch 53s1.

FIG. 11(a) illustrates a connection configuration in the charging operation of the capacitor 51f. In this case, a control unit 90E outputs the control signal φ3 and a control signal φ5 that make the switches 53s3 and 53s5 conductive. The control unit 90E outputs the control signal φ4 and a control signal φ6 for disconnecting the switches 53s4 and 53s6.

FIG. 11(b) illustrates a connection configuration in the charging operation of the secondary battery 10. In this connection configuration, an input from the power generation element 20 is used. The control unit 90E outputs the control signals φ4 and φ5 for making the switches 53s4 and 53s5 conductive. The control unit 90E outputs the control signals φ3 and φ6 for disconnecting the switches 53s3 and 53s6.

FIG. 11(c) illustrates a connection configuration in the charging operation of the secondary battery 10. In this connection configuration, an input from the capacitor 51f is used. The control unit 90E outputs the control signal φ4 and a control signal φ6 for making the switches 53s4 and 53s6 conductive. The control unit 90E outputs the control signals φ3 and φ5 for disconnecting the switches 53s3 and 53s5.

The power supply device 1E of the modification example can continue to output a desired power for a long period of time, similar to the power supply device 1B of the second embodiment.

Fifth Embodiment

Figure 12:
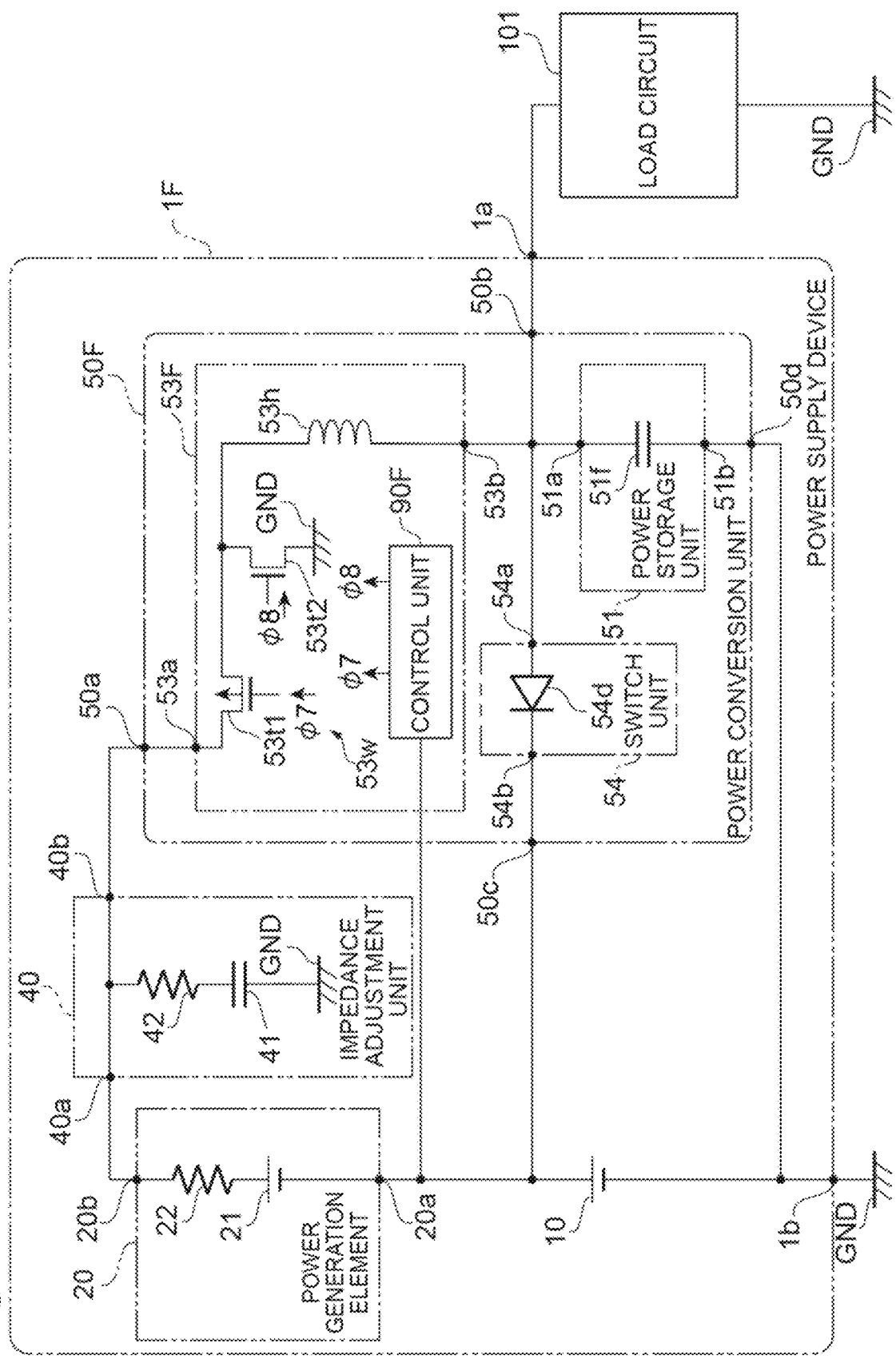
FIG. 12 is a diagram illustrating a configuration of a power supply device according to a fifth embodiment.

A power supply device 1F of a fifth embodiment illustrated in FIG. 12 will be described. The power supply device 1F of the fifth embodiment includes a secondary battery 10, a power generation element 20, an impedance adjustment unit 40, a power conversion unit 50F, and a control unit 90F. The control unit 90F of the power supply device 1F of the fifth embodiment receives power from the secondary battery 10. In the fifth embodiment, a specific circuit example of the voltage conversion unit 53F is shown. A configuration and operation of the secondary battery 10, the power generation element 20, the impedance adjustment unit 40, the switch unit 54, and the power storage unit 51 are the same as those in the second embodiment. Therefore, detailed description will be omitted. The control unit 90F and the voltage conversion unit 53F will be described in detail.

The voltage conversion unit 53F of the fifth embodiment is a step-down DC/DC converter 53w. The voltage conversion unit 53F includes transistors 53t1 and 53t2 as switch elements and a coil 53h. The transistor 53t1 is connected in series with the coil 53h. The transistor 53t1 controls transfer of energy (power) to the coil 53h. A duty ratio of a transferred voltage can be adjusted by controlling the transistor 53t1. Therefore, it is possible to control a level of a voltage to be dropped. Operation of the transistors 53t1 and 53t2 is controlled by control signals $\varphi 7$ and $\varphi 8$ output from the control unit 90F.

Figure 13:
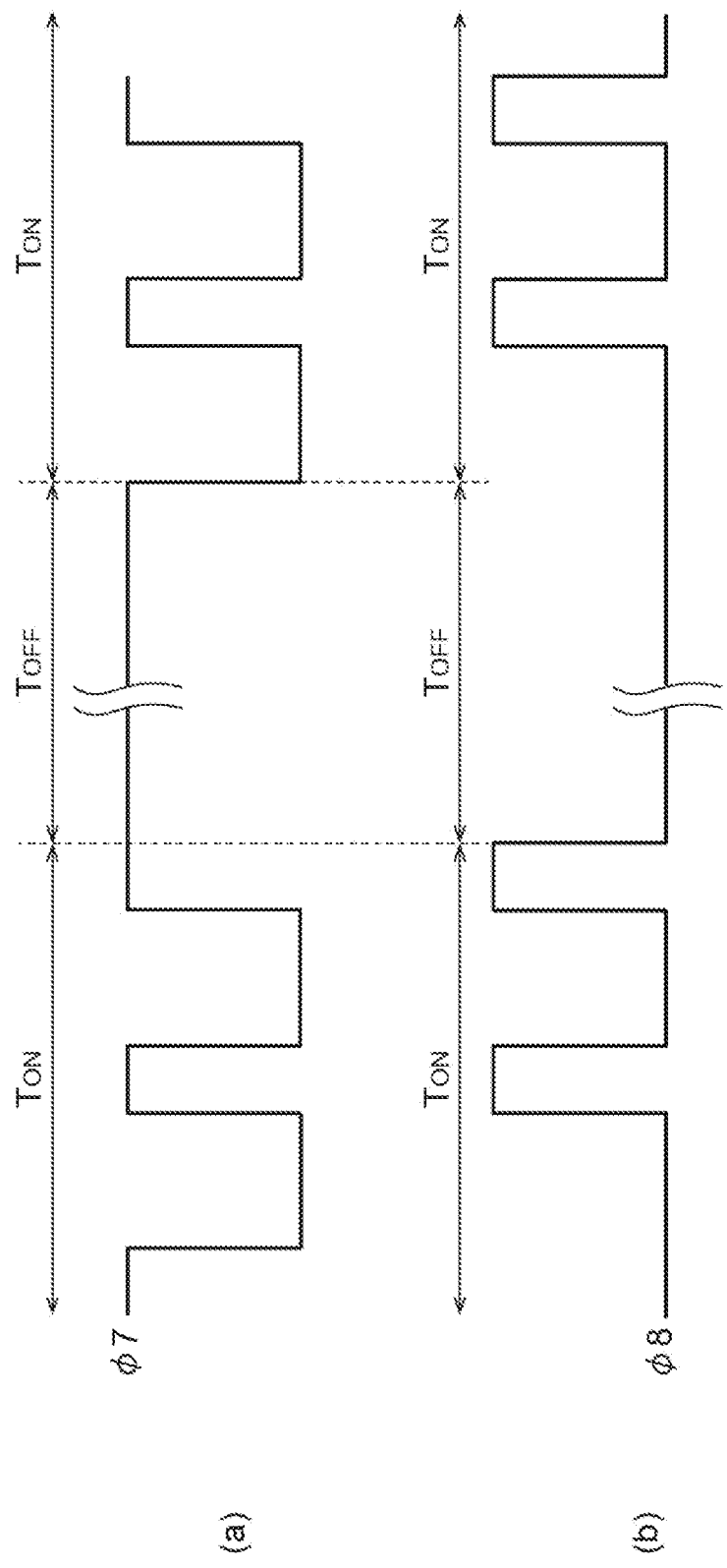
FIGS. 13(*a*) and 13(*b*) illustrate control signals that are output by a control unit of the power supply device illustrated in FIG. 12.

The control unit 90F outputs the control signals $\varphi 7$ and $\varphi 8$ to the transistors 53t1 and 53t2 of the voltage conversion unit 53F. For example, the control unit 90F outputs the control signal $\varphi 7$ shown in FIG. 13(a) and the control signal $\varphi 8$ shown in FIG. 13(b). In each of the control signals $\varphi 7$ and $\varphi 8$, the voltage conversion unit 53F performs a step-down operation in a period $T_{ON}$. The voltage conversion unit 53F stops the step-down operation in a period $T_{OFF}$. Content of the control signals $\varphi 7$ and $\varphi 8$ may be appropriately changed depending on a relationship between a voltage ($V_{IN}$) to be received and the voltage ($V_{CNV}$) to be output.

The control unit 90F receives power required for an operation thereof from the secondary battery 10. The control unit 90F is connected to the secondary battery 10. The power generation element 20 outputs the power in response to an input of external energy. The secondary battery 10 outputs power stored in advance. Therefore, the secondary battery 10 can stably supply power to the control unit 90F without depending on external factors.

In the fifth embodiment, a case in which the control unit 90F is an element constituting the voltage conversion unit 53F has been described. The control unit 90F may not be the element constituting the voltage conversion unit 53F. The control unit 90F may be a component different from the voltage conversion unit 53F included in the power supply device 1F.

The power supply device 1F of the fifth embodiment can continue to output a desired power for a long period of time, similar to the power supply device 1B of the second embodiment.

In the power supply device 1F of the fifth embodiment, the control unit 90F that controls the voltage conversion unit 53F receives the power from the secondary battery 10. The secondary battery 10 can supply a stabilized power. Therefore, the control unit 90F operates reliably. As a result, the voltage conversion unit 53F can be reliably operated.

The power supply device of the present invention is not limited to the above embodiment. For example, the impedance adjustment unit may adopt circuit configurations shown in modification examples 3 to 5 below.

Modification Example 3

Figure 14:
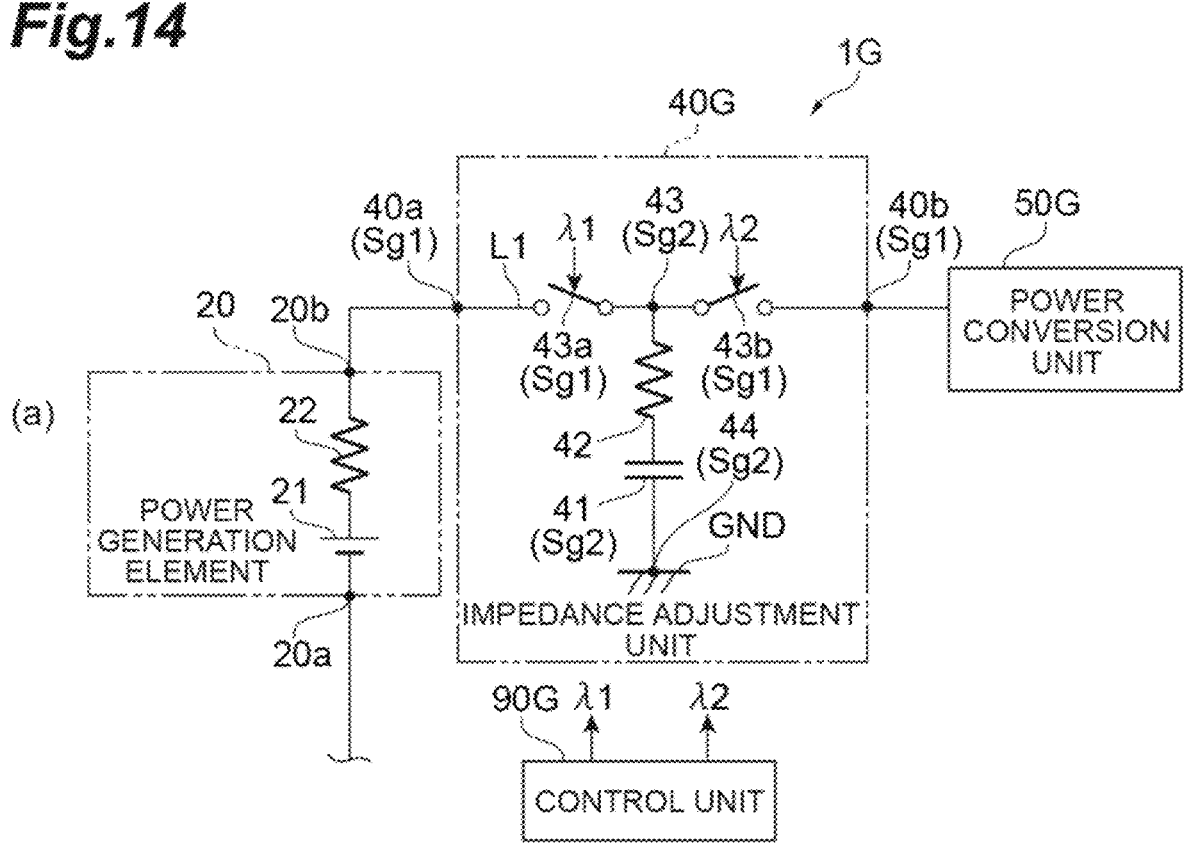
FIG. 14(*a*) is a diagram illustrating a part of a configuration of a power supply device of modification example 3.
Figure 14:
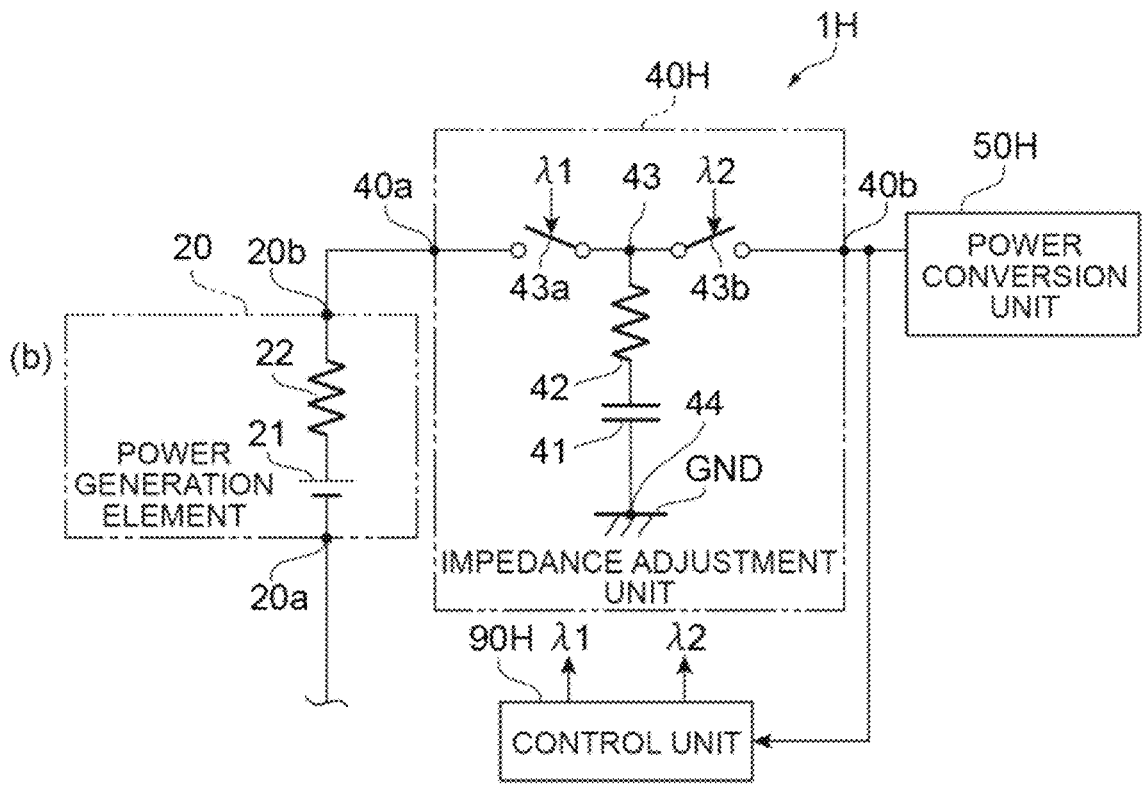

As illustrated in FIG. 14(a), an impedance adjustment unit 40G of a power supply device 1G of modification example 3 includes switches 43a and 43b. The switches 43a and 43b are disposed between an input terminal 40a and an output terminal 40b. The switch 43a is connected to the input terminal 40a. The switch 43a is also connected to the switch 43b. The switch 43b is connected to the switch 43a. The switch 43b is also connected to the output terminal 40b. The input terminal 40a, the output terminal 40b, and the switches 43a and 43b constitute a first circuit unit Sg1. The switches 43a and 43b are connected to a capacitor 41. In other words, a line L1 connecting the switches 43a and 43b to each other has a connection point 43 with a line connected to the capacitor 41.

The input terminal 40a is connected to the output terminal 40b. The line L1 connecting the input terminal 40a and the output terminal 40b to each other has the connection point 43 to which one terminal of the capacitor 41 is connected. The connection point 43, a connection point 44, and the capacitor 41 constitute a second circuit unit Sg2.

A control unit 90G outputs control signals $\lambda 1$ and $\lambda 2$ for a charging operation to the impedance adjustment unit 40G. Specifically, the control unit 90G sets the control signal $\lambda 1$ to HIGH. The control signal $\lambda 2$ is assumed to be at LOW. When the impedance adjustment unit 40G receives the control signal $\lambda 1$<HIGH>, the impedance adjustment unit 40G connects the input terminal 40a to the capacitor 41 using the switch 43a. As a result, the capacitor 41 is charged with the power generated by the power generation element 20. Further, when the impedance adjustment unit 40G receives the control signal $\lambda 2$<LOW>, the impedance adjustment unit 40G disconnects the output terminal 40b from the capacitor 41 using the switch 43b. As a result, no power is output to the output terminal 40b. In other words, a power conversion unit 50G is disconnected from the impedance adjustment unit 40. The power conversion unit 50G is disconnected from the power generation element 20. Therefore, in the charging operation, the power conversion unit 50G does not output power.

The control unit 90G outputs a control signal for a discharging operation to the impedance adjustment unit 40G after a predetermined time has elapsed from a timing at which the control signal for a charging operation is output. Specifically, the control unit 90G outputs the control signal $\lambda 1$<LOW> and the control signal $\lambda 2$<HIGH>. When the impedance adjustment unit 40G receives the control signal $\lambda 1$<LOW>, the impedance adjustment unit 40G disconnects the input terminal 40a from the capacitor 41 using the switch 43a. Aa a result, the capacitor 41 is disconnected from the input terminal 40a. This state is a state in which the power generation element 20 is disconnected from the impedance adjustment unit 40G. In other words, the power generation element 20 is disconnected from the power conversion unit 50G. When the impedance adjustment unit 40O receives the control signal $\lambda 2$ <HIGH>, the impedance adjustment unit 40G connects the output terminal 40b to the capacitor 41 using the switch 43b. In other words, the impedance adjustment unit 40G is connected to the power conversion unit 50G. As a result, a voltage is output from the capacitor 41 to the output terminal 40b. An impedance (the output resistor 22) of the power generation element 20 is not visible from the power conversion unit 50G. Therefore, the power conversion unit 50G can receive a voltage close to an open voltage of the power generation element 20. Accordingly, a voltage with little or no influence of voltage drop is output to the power conversion unit 50G. The power conversion unit 50G starts an operation depending on the voltage. As a result, the power conversion unit 50G outputs a boosted voltage.

The control unit 90G presets respective lengths of a period of the charging operation and a period of the discharging operation. That is, the period of the charging operation and the period of the discharging operation are fixed times. For example, the period of the charging operation is longer than the period of discharging operation. The power conversion unit 50G performs power conversion only during the period of the discharging operation. The power conversion unit 50G outputs an output current to the output terminal 40b only during the period of the discharging operation.

When the discharging operation is performed, the power conversion unit 50O is disconnected from the power generation element 20. The impedance adjustment unit 40G includes the switches 43a and 43b and the capacitor 41 as components. Therefore, the impedance adjustment unit 40G, ideally, may not consider an output resistor. In an actual circuit configuration, there is an output resistor 42. However, since the output resistor 42 has an extremely small resistance, the output resistor 42 can be considered to have a zero resistance. FIG. 14(a) clearly illustrates the output resistor 42. However, the impedance adjustment unit 40G may not include the output resistor 42 as a resistance element. The output resistor 42 explicitly indicates, for example, a normally ignored resistance component, which is resistance of a line connecting the capacitor 41 to the switch 43b. In this circuit configuration, an output impedance is zero or an extremely low supply voltage is connected to the power conversion unit 50G. Therefore, a voltage on the power supply side (the impedance adjustment unit 40G) does not decrease due to non-adjustment of an impedance between the power supply side and the load side (the power conversion unit 50G). As a result, it is possible to efficiently deliver power to the power conversion unit 50G.

In order to operate the power conversion unit 50G, it is necessary to generate a predetermined current according to a predetermined voltage required by an integrated circuit that is a load of the power conversion unit 50G. When the power generation element 20 is directly connected to the power conversion unit 50G, the voltage output to the power conversion unit 50G decreases due to a high output impedance (output resistor 22) of the power generation element 20. An output current that could be output when there was no voltage drop decreases greatly. Therefore, by using the impedance adjustment unit 40G, an ideal state in which the impedance is zero is realized. According to this ideal state, it is possible to output power to the power conversion unit 50O. As a result, for example, even when a period during which the impedance adjustment unit 40G is connected to the power conversion unit 50G is set to ⅓ of a period during which the power is output from the power generation element 20, it is possible to output ⅓ of the output current to the power conversion unit 50G.

According to the impedance adjustment unit 40G, it becomes possible to perform power conversion even with a low open voltage. Therefore, even when energy input to the power generation element 20 is low, it is possible to recover the energy as power.

Modification Example 4

As illustrated in FIG. 14(b), a control unit 90H of a power supply device 1I1 according to modification example 4 may perform control using a voltage that is output to an output terminal 40b of an impedance adjustment unit 40H. The power supply device 1H of modification example 4 includes a control unit 90H connected to the output terminal 40b, in addition to the configuration of the impedance adjustment unit 40G of modification example 3. The voltage that is output to the output terminal 40b by a discharging operation decreases with the passage of time. The control unit 90H monitors the voltage that is output to the output terminal 40b. The control unit 90H performs switching from the discharging operation to a charging operation when the voltage decreases by a predetermined ratio with reference to a voltage when the discharging operation has started. For example, the voltage when the discharging operation has started is defined as 100%. When the voltage at the output terminal 40b has decreased to 90% or less with respect to the voltage when the discharging operation has started, the control unit 90H may perform switching from the discharging operation to the charging operation.

Modification Example 5

Figure 15:
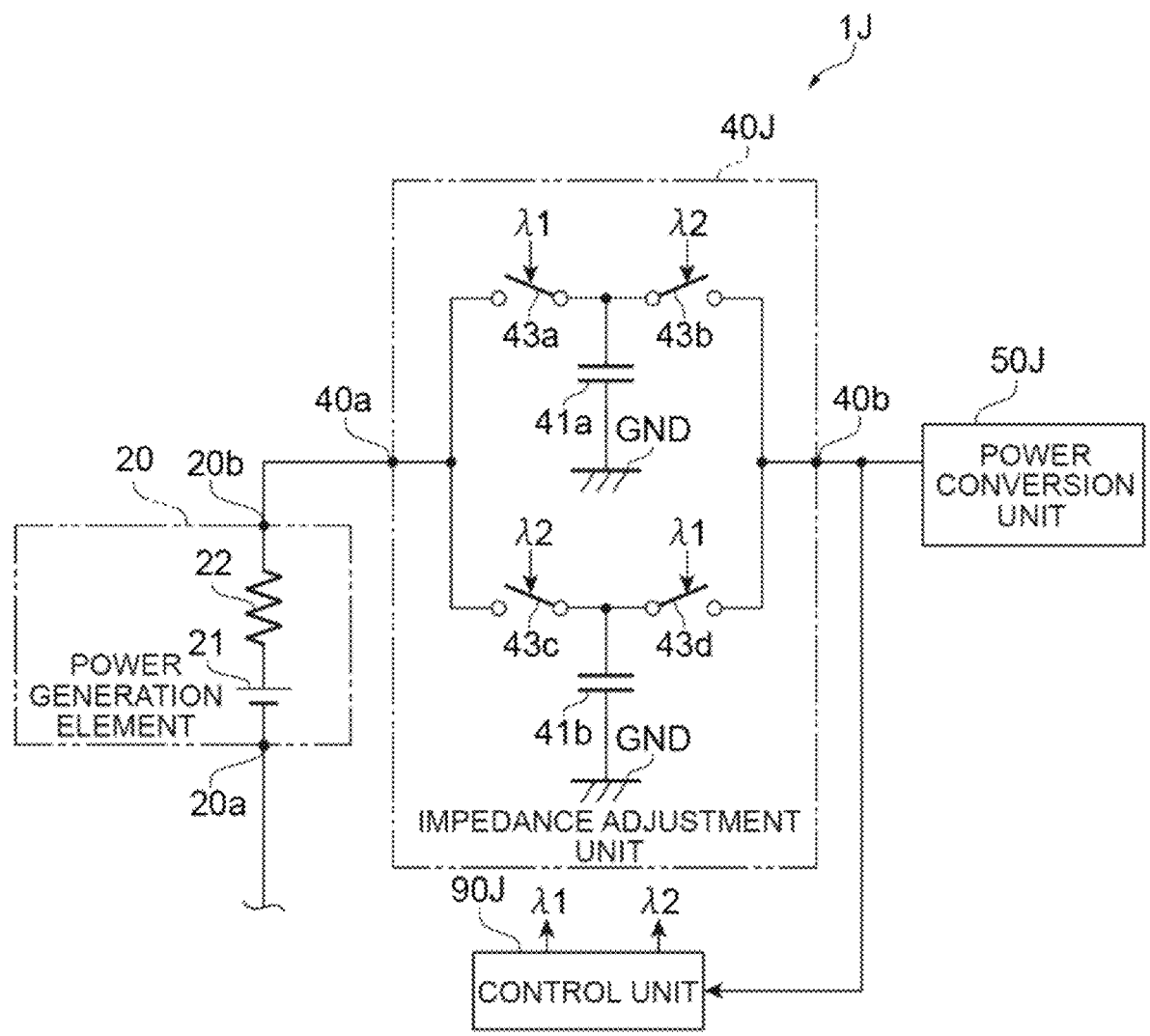
FIG. 15 is a diagram illustrating a part of a configuration of a power supply device of modification example 5.

As illustrated in FIG. 15, a power supply device 1J of modification example 5 includes an impedance adjustment unit 40J, and a control unit 90J. The impedance adjustment unit 40J of modification example 5 further includes four switches 43a, 43b, 43c, and 43d, and two capacitors 41a and 41b. In this configuration, the impedance adjustment unit 40G of modification example 3 is connected in parallel.

Specifically, the switch 43a is connected to an input terminal 40a, the switch 43b, and the capacitor 41a. The switch 43b is connected to the switch 43a, the capacitor 41a, and an output terminal 40b. The capacitor 41a is connected to the switches 43a and 43b and the ground potential GND. The switch 43c is connected to the input terminal 40a, the switch 43d, and the capacitor 41b. The switch 43d is connected to the switch 43c, the capacitor 41b, and the output terminal 40b. The capacitor 41b is connected to the switches 43c and 43d and the ground potential GND. The switches 43a and 43d are controlled by a control signal λ1. The switches 43b and 43c are controlled by a control signal λ2. The control unit 90J switches between a charging operation and a discharging operation using a voltage of the output terminal 40b of the impedance adjustment unit 40J. The control unit 90J may periodically switch between the operations on the basis of a preset period.

When the one capacitor 41a is charged, the impedance adjustment unit 40J discharges the other capacitor 41b. For example, when the control signal λ1<HIGH> and the control signal 72<LOW> are output, the capacitor 41a is connected to the power generation element 20 and disconnected from the power conversion unit 50J.

The capacitor 41b is disconnected from the power generation element 20 and connected to the power conversion unit 50J. That is, the capacitor 41a is charged. The capacitor 41b is discharged. When the control signal λ1<LOW> and the control signal λ2<HIGH> are output, the capacitor 41a is disconnected from the power generation element 20 and connected to the power conversion unit 50J. The capacitor 41b is connected to the power generation element 20 and disconnected from the power conversion unit 50J. That is, the capacitor 41a is discharged. The capacitor 41b is charged.

The impedance adjustment unit 40J of modification example 5 includes the two capacitors 41a and 41b. As a result, it is possible to increase a period during which the power is output to the power conversion unit 50I. Therefore, it is possible to increase a period during which the voltage is output from the power conversion unit 50J (a voltage conversion period). In other words, it is possible to increase the voltage conversion period.

Modification Example 6

The example in which the switch unit 54 is configured of the diode 54d and the example in which the switch unit 54 is configured of the transistor 54t have been described above. The switch unit 54 is not limited to the diode and the transistor. For example, the switch unit 54 can also be configured of an electric resistance element.

Examination Example

Figure 16:
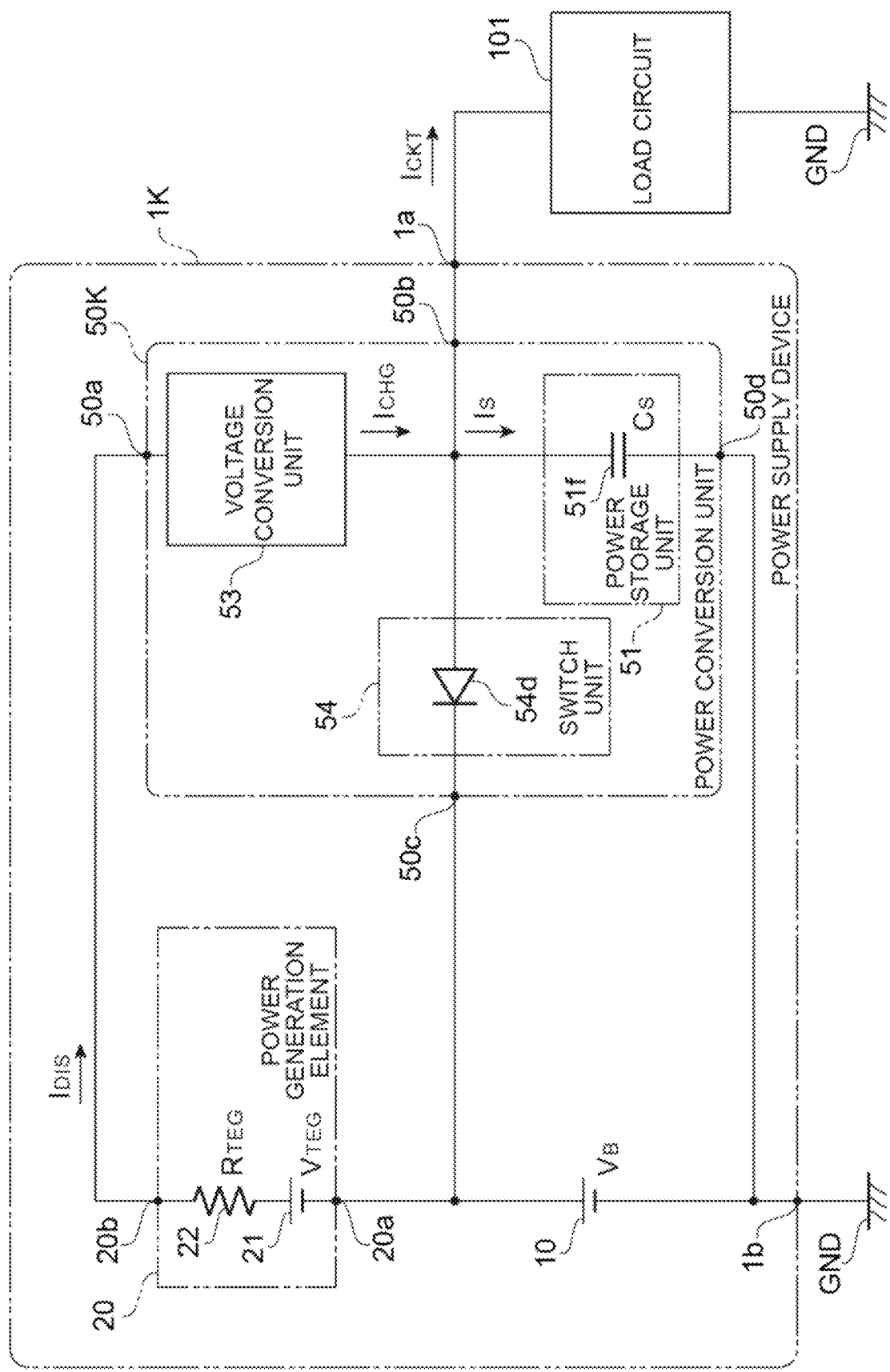
FIG. 16 is a diagram illustrating a part of a configuration of a power supply device of an examination example.

In an examination example, an influence of the recovery of power to a secondary battery 10 on the life of the secondary battery 10 in a power supply device 1K illustrated in FIG. 16 has been confirmed. The power supply device 1K has a configuration similar to that of the power supply device 1C of the third embodiment. Specifically, the power supply device 1K does not include the impedance adjustment unit 40 in the power supply device 1C of the third embodiment.

Figure 17:
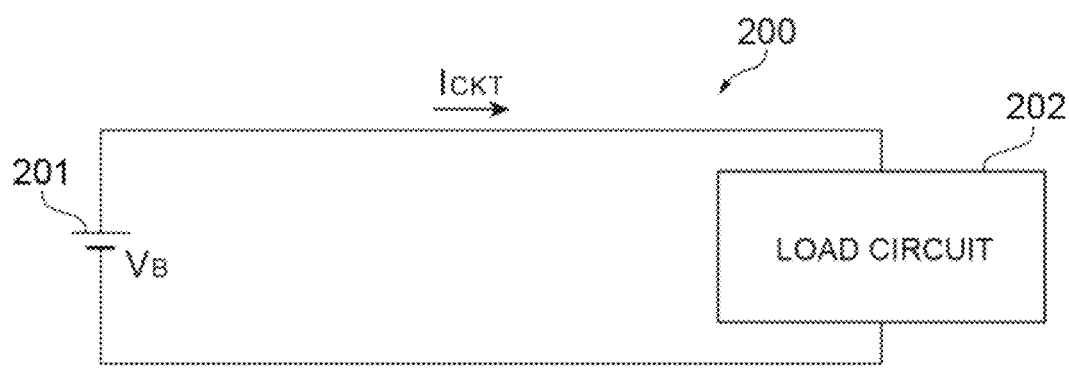
FIG. 17 is a diagram illustrating a part of a circuit configuration of a comparative example.

A circuit 200 illustrated in FIG. 17 is presented as a comparative example. The circuit 200) includes a battery 201 and a load circuit 202. The battery 201 is only discharged. The battery 201 is not charged. The battery 201 outputs a voltage ($V_{BAT}$). As a result, a current ($I_{CKT}$) is output to a load circuit 202. In this case, a loss of energy caused by the current ($I_{CKT}$) is defined as $\Delta E_{CONV}$. The lost energy ($\Delta E_{CONV}$) is defined by Equation (1).

[Math. 1]

$$\Delta E_{CONV} = V_{BAT} \times I_{CKT} \times T_S \quad (1)$$

An index Battery Life Extension (BLE) is presented as an index for evaluating the influence of the recovery of the power to the secondary battery 10 on the life of the secondary battery 10. The index BLE is defined by Equation (2).

[Math. 2]

$$BLE = \Delta E_{CONV} / \Delta E_{PROP} \quad (2)$$

$\Delta E_{CONV}$: Lost energy in the circuit of the comparative example.
$\Delta E_{PROP}$: Lost energy in the circuit of the examination example.

The lost energy ($\Delta E_{PROP}$) of the power supply device 1K is obtained. The lost energy ($\Delta E_{PROP}$) is defined by Equation (3).

[Math. 3]

$$\Delta E_{PROP} = \Delta E_B - \Delta E_R \quad (3)$$

$\Delta E_B$: Lost energy caused by a current ($I_{DIS}$) input to the voltage conversion unit 53.
$\Delta E_R$: Recovered energy output from the power storage unit 51 to the secondary battery 10.

The lost energy ($\Delta E_B$) is defined by Equation (4).

[Math. 4]

$$\Delta E_B = V_B \times I_{DIS} \times T_S \quad (4)$$

The recovered energy ($\Delta E_R$) is defined by Equation (5).

[Math. 5]

$$\Delta E_R = \frac{C_S}{2}[(V_B + \Delta V)^2 - V_B^2] \quad (6)$$

Other variables shown in FIG. 16 are defined by Equations (6) to (8).

[Math. 6]

$$I_{CHG} = I_{DIS} \times \frac{V_{IN}}{V_B + \Delta V} \times \eta \quad (6)$$

[Math. 7]

$$T_S = \frac{C_S \Delta V}{I_S} \quad (7)$$

[Math. 8]

$$I_{CHG} = I_S + I_{CKT} \quad (8)$$

Realistic values were applied to the above-described equations in order to evaluate the life of the secondary battery 10. The values used for evaluation are as follows.

Figure 18:
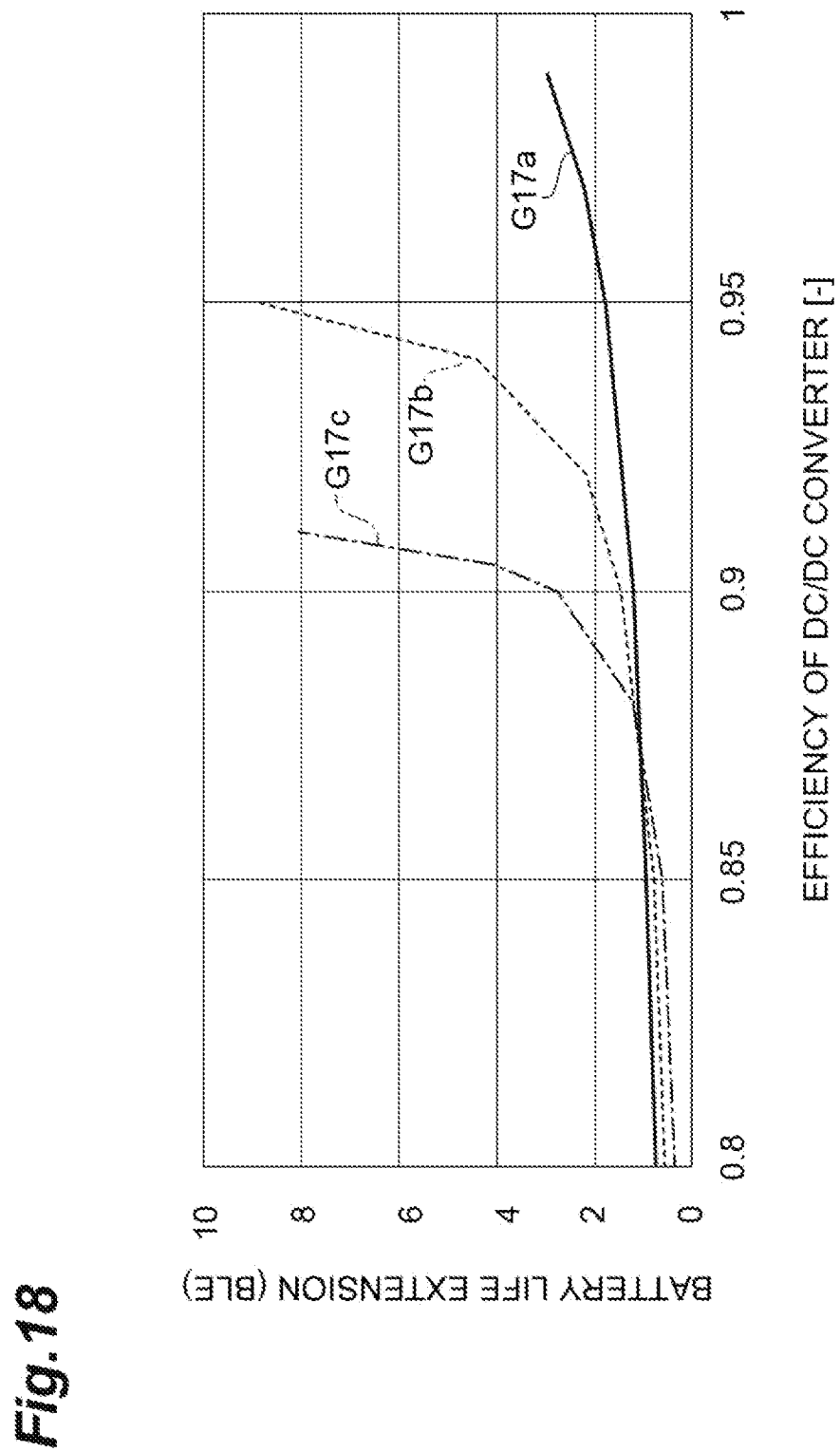
FIG. 18 is a graph showing a result of examination regarding the life of the secondary battery.

Voltage ($V_{BAT}$): 3 V
Current ($I_{DIS}$): 1×10$^{-4}$ A
Voltage ($V_{TEG}$): 0.6 V
Resistance ($R_{TEG}$): 1×10$^3$ Ω
Capacitance of capacitor ($C_S$): 1×10$^{-6}$ F
Voltage ($\Delta V$): 0.1 V
Conversion efficiency (η): 0.94
Current ($I_{CHG}$): 1.06×10$^{-4}$ A
Current ($I_{CKT}$): 1.00×10$^{-5}$ A
Current ($I_S$): 9.61×10$^{-5}$ A
Time ($T_S$): 1.04×10$^{-3}$ seconds FIG. 18 is a graph showing a result of evaluation. A horizontal axis indicates efficiency of the DC/DC converter. A vertical axis indicates an index of battery life extension (BLE). A graph G17a shows a result when the current ($I_{CKT}$) consumed by the load circuits 101 and 202 is set to 20 μA. A graph G17b shows a result when the current ($I_{CKT}$) consumed by the load circuits 101 and 202 is 10 μA. A graph G17c shows a result when the current ($I_{CKT}$) consumed by the load circuits 101 and 202 is 5 μA.

It was found that the index (BLE) was larger than 1 when the conversion efficiency of the DC/DC converter was 90% or more regardless of a value of the current ($I_{CKT}$) consumed by the load circuits 101 and 202. That is, it was found that the life of the secondary battery 10 is extended due to the recovery of the power to the secondary battery 10. For example, when the current ($I_{CKT}$) is 5 μA and the conversion efficiency (q) is 92%, it was found that all of the power consumed by the load circuit 101 can be covered by the power that is output by the power generation element 20. In other words, theoretically, power consumption does not occur in the secondary battery 10. In reality, the life of the secondary battery 10 is finite due to characteristics such as natural discharge of the secondary battery 10. That is, the life of the secondary battery 10 is determined by the natural discharge characteristics. The conversion efficiency (η) of the DC/DC converter is likely to exceed 90% depending on commercially available components. Therefore, according to realistic operating variables, it has been revealed that the life of the secondary battery 10 can be extended to several times to 10 times through recovery of the power to the secondary battery 10.

REFERENCE SIGNS LIST

1 Power supply device
10 Secondary battery
20 Power generation element
22 Output resistor
30 Switch unit
40 Impedance adjustment unit
41 Capacitor
42 Output resistor
50 Power conversion unit
50*a* input terminal
50*b* Output terminal (first output terminal)
50*c* Output terminal (second output terminal)
51 Power storage unit
51*f* Capacitor
52 Distribution unit
53 Voltage conversion unit
54 Switch unit
54*d* Diode
54*t* Transistor
101 Load circuit

The invention claimed is:

1. A power supply device comprising:
a power generation element configured to convert external energy into electrical energy and output the electrical energy as a first voltage;
a secondary battery configured to be connected in series with the power generation element and output a second voltage; and
a power conversion unit configured to receive the first voltage and the second voltage and output power to a load circuit,
wherein the power conversion unit includes
a voltage conversion unit connected in series with the power generation element and the secondary battery;
a power storage unit connected to the voltage conversion unit;
a first output terminal configured to connect the power storage unit to the load circuit; and
a second output terminal configured to connect the power storage unit to the secondary battery.

2. The power supply device according to claim 1, wherein the voltage conversion unit receives the first voltage from the power generation element and the second voltage from the secondary battery, and converts a third voltage, the third voltage being a sum of the first voltage and the second voltage, to a fourth voltage equal to or higher than the second voltage and equal to or lower than the third voltage.

3. The power supply device according to claim 2, wherein the power storage unit stores power based on the fourth voltage.

4. The power supply device according to claim 1, wherein the power conversion unit is capable to switch between a charging state in which power is supplied from the power storage unit to the secondary battery and a non-charging state in which the supply of the power from the power storage unit to the secondary battery stops.

5. The power supply device according to claim 1, wherein the secondary battery has a first terminal and a second terminal, wherein the first terminal of the secondary battery is connected to a ground potential, and the second terminal of the secondary battery is connected to the power generation element and the power conversion unit, wherein the power generation element has a first terminal and a second terminal, and wherein the first terminal of the power generation element is connected to the secondary battery, and the second terminal of the power generation element is connected to the power conversion unit.

6. The power supply device according to claim 5, further comprising:
an impedance adjustment unit configured to deliver power from the power generation element to the power conversion unit,
wherein the impedance adjustment unit includes
a first circuit unit including an input terminal connected to the power generation element and an output terminal connected to the power conversion unit, and
a second circuit unit including a first connection point connected to the first circuit unit, a second connection point connected to a ground potential, and a capacitor connected between the first connection point and the second connection point, and a resistance of an output resistor included in the second circuit unit is smaller than that of an output resistor included in the power generation element.

* * * * *